US008838694B2

(12) United States Patent
Mahdi

(10) Patent No.: US 8,838,694 B2
(45) Date of Patent: Sep. 16, 2014

(54) SYSTEM AND METHOD FOR SHARED MULTIMEDIA EXPERIENCES ACROSS MULTIPLE SUBSCRIPTIONS

(75) Inventor: Kaniz Mahdi, Carrollton, TX (US)

(73) Assignee: Futurewei Technologies, Inc., Plano, TX (US)

( * ) Notice: Subject to any disclaimer, the term of this patent is extended or adjusted under 35 U.S.C. 154(b) by 500 days.

(21) Appl. No.: 12/814,316

(22) Filed: Jun. 11, 2010

(65) Prior Publication Data

US 2010/0325212 A1 Dec. 23, 2010

Related U.S. Application Data

(60) Provisional application No. 61/218,633, filed on Jun. 19, 2009.

(51) Int. Cl.
*G06F 15/16* (2006.01)
*H04L 29/06* (2006.01)

(52) U.S. Cl.
CPC .................................. *H04L 65/1016* (2013.01)
USPC ............ 709/205; 709/219; 709/227; 379/252

(58) Field of Classification Search
CPC .................................................. H04L 65/1016
USPC ......................................................... 709/205
See application file for complete search history.

(56) References Cited

U.S. PATENT DOCUMENTS

| 5,649,105 | A * | 7/1997 | Aldred et al. ................. 709/220 |
| 5,742,668 | A * | 4/1998 | Pepe et al. ..................... 455/415 |
| 2003/0018725 | A1 * | 1/2003 | Turner et al. ................... 709/206 |
| 2005/0060411 | A1 | 3/2005 | Coulombe et al. |
| 2006/0221858 | A1 * | 10/2006 | Switzer et al. ................. 370/254 |
| 2007/0118659 | A1 * | 5/2007 | Cuny et al. .................... 709/227 |
| 2007/0127642 | A1 * | 6/2007 | Bae et al. .................... 379/88.13 |
| 2007/0217394 | A1 | 9/2007 | Greene et al. |
| 2008/0209075 | A1 * | 8/2008 | Shamma ....................... 709/248 |
| 2008/0301308 | A1 | 12/2008 | Li et al. |
| 2010/0182997 | A1 | 7/2010 | Yang et al. |
| 2011/0053571 | A1 | 3/2011 | Mahdi et al. |

FOREIGN PATENT DOCUMENTS

| CN | 101026616 A | 8/2007 |
| CN | 101115059 A | 1/2008 |
| CN | 101179458 A | 5/2008 |

OTHER PUBLICATIONS

PCT Written Opinion of the International Searching Authority, PCT/CN/2010/074147, Huawei Technologies Co. Ltd., Sep. 9, 2010, 5 pages.
PCT International Search Report, PCT/CN2010/074147, Huawei Technologies Co. Ltd., Sep. 9, 2010, 12 pages.

* cited by examiner

*Primary Examiner* — Hua Fan
(74) *Attorney, Agent, or Firm* — Slater & Matsil, L.L.P.

(57) ABSTRACT

A system and method for shared multimedia experiences across multiple subscriptions are provided. A method for application server operations includes receiving a first message from an application server, the first message including a request to initiate a collaborative session with a first communications device and a second communications device, examining a first profile of the first communications device and a second profile of the second communications device, establishing the collaborative session with the second communications device based on the first profile of the first communications device and the second profile of the second communications device, and sending a second message to the application server, the second message including information regarding the collaborative session.

26 Claims, 29 Drawing Sheets

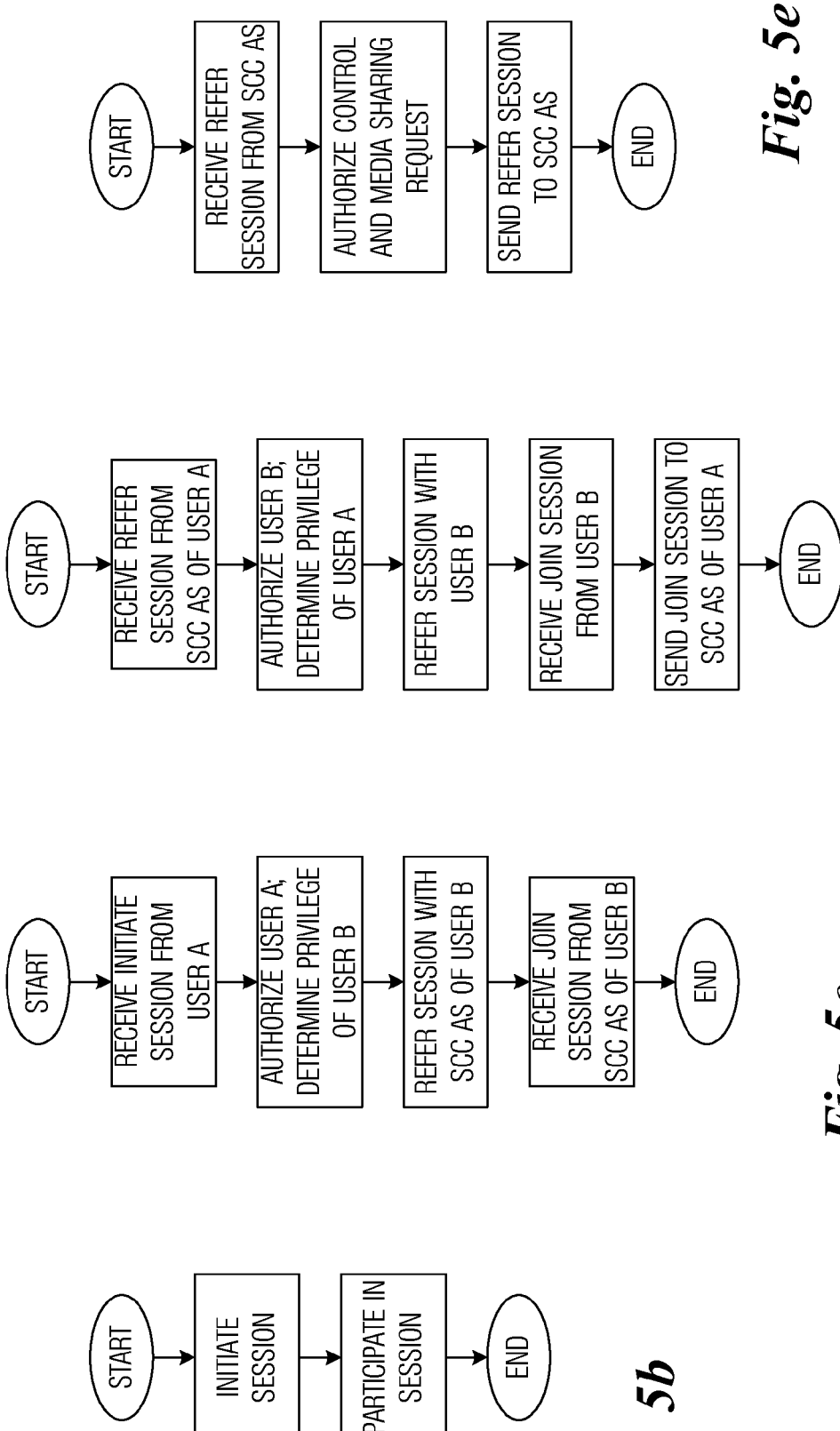

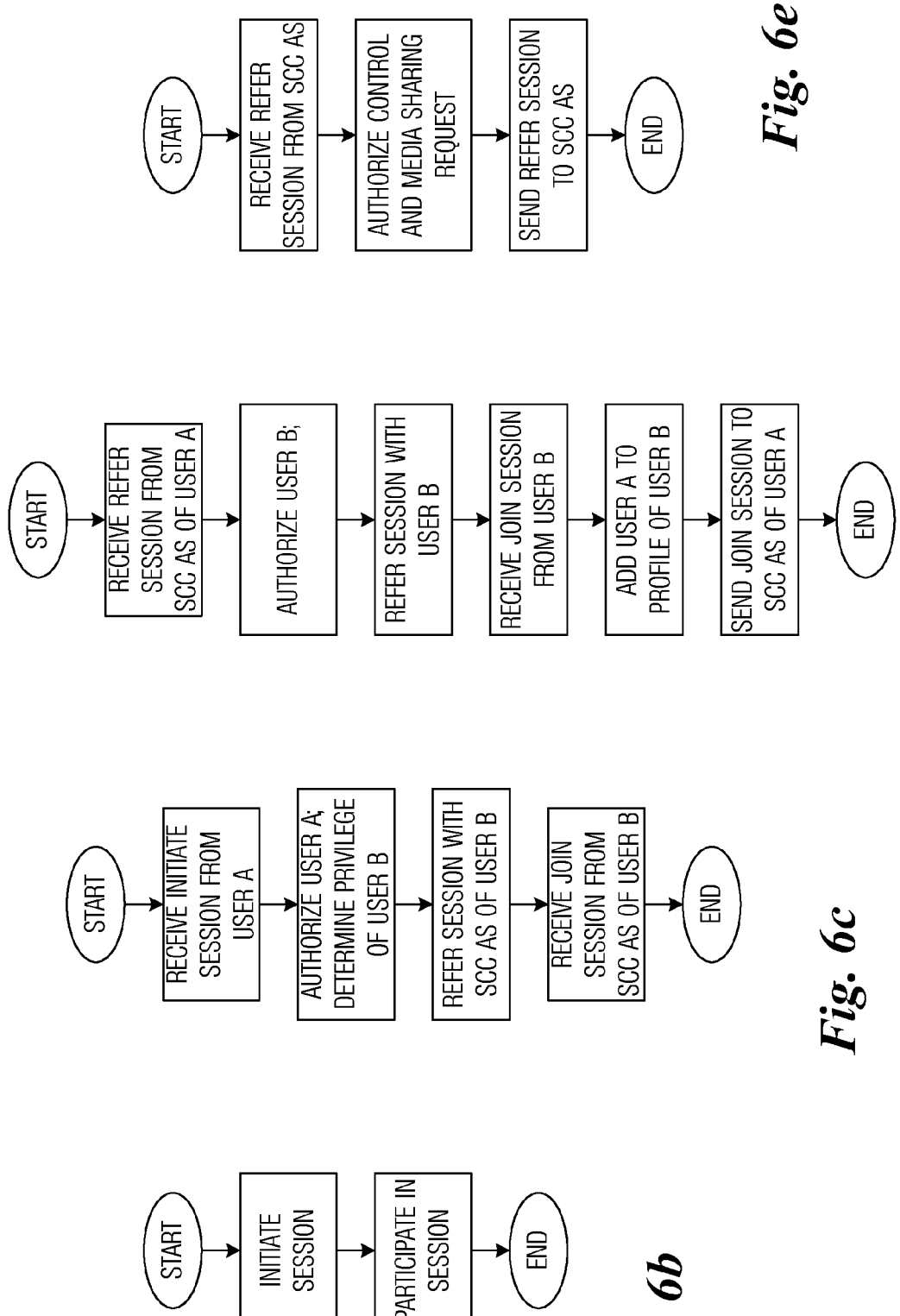

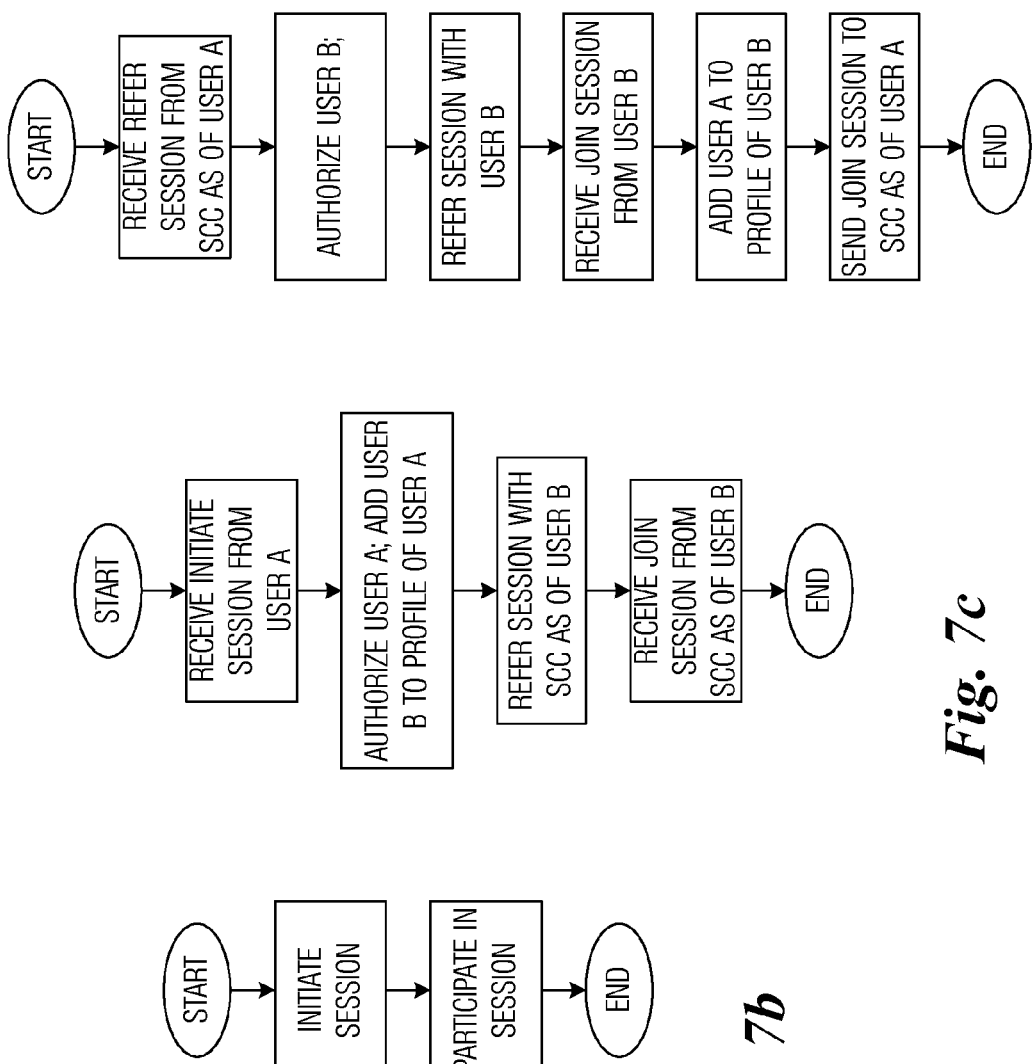
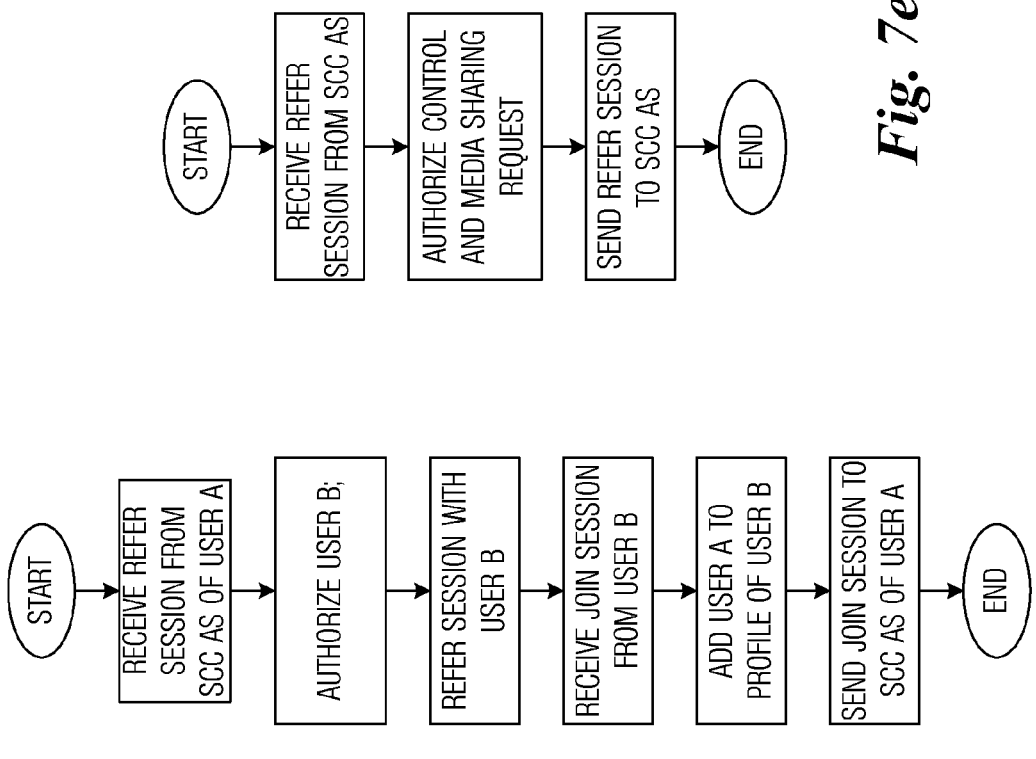
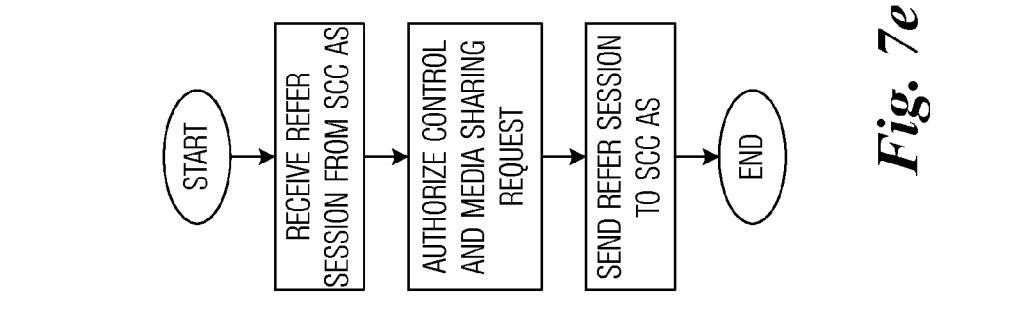
Fig. 7e
Fig. 7d
Fig. 7c
Fig. 7b

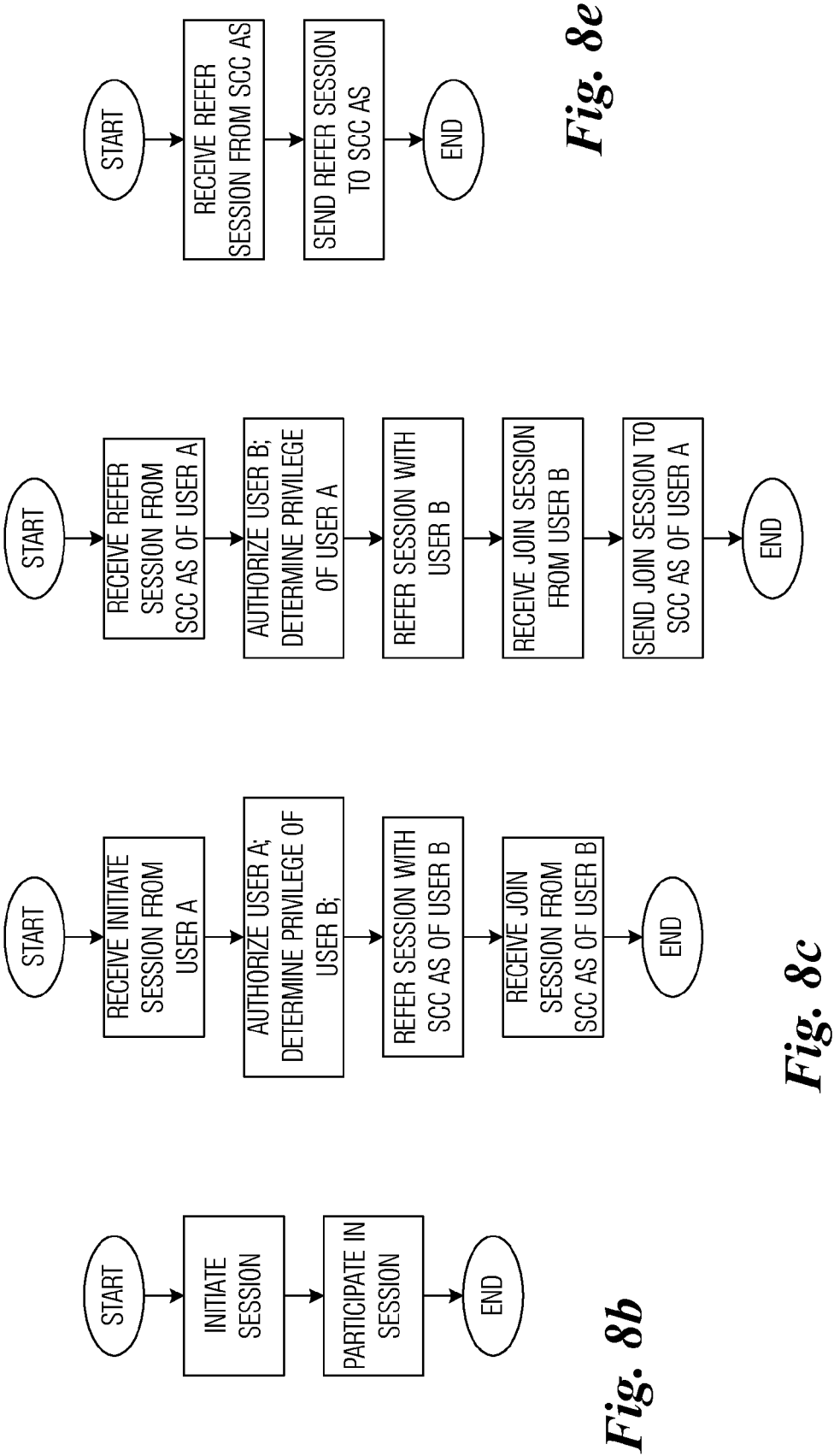

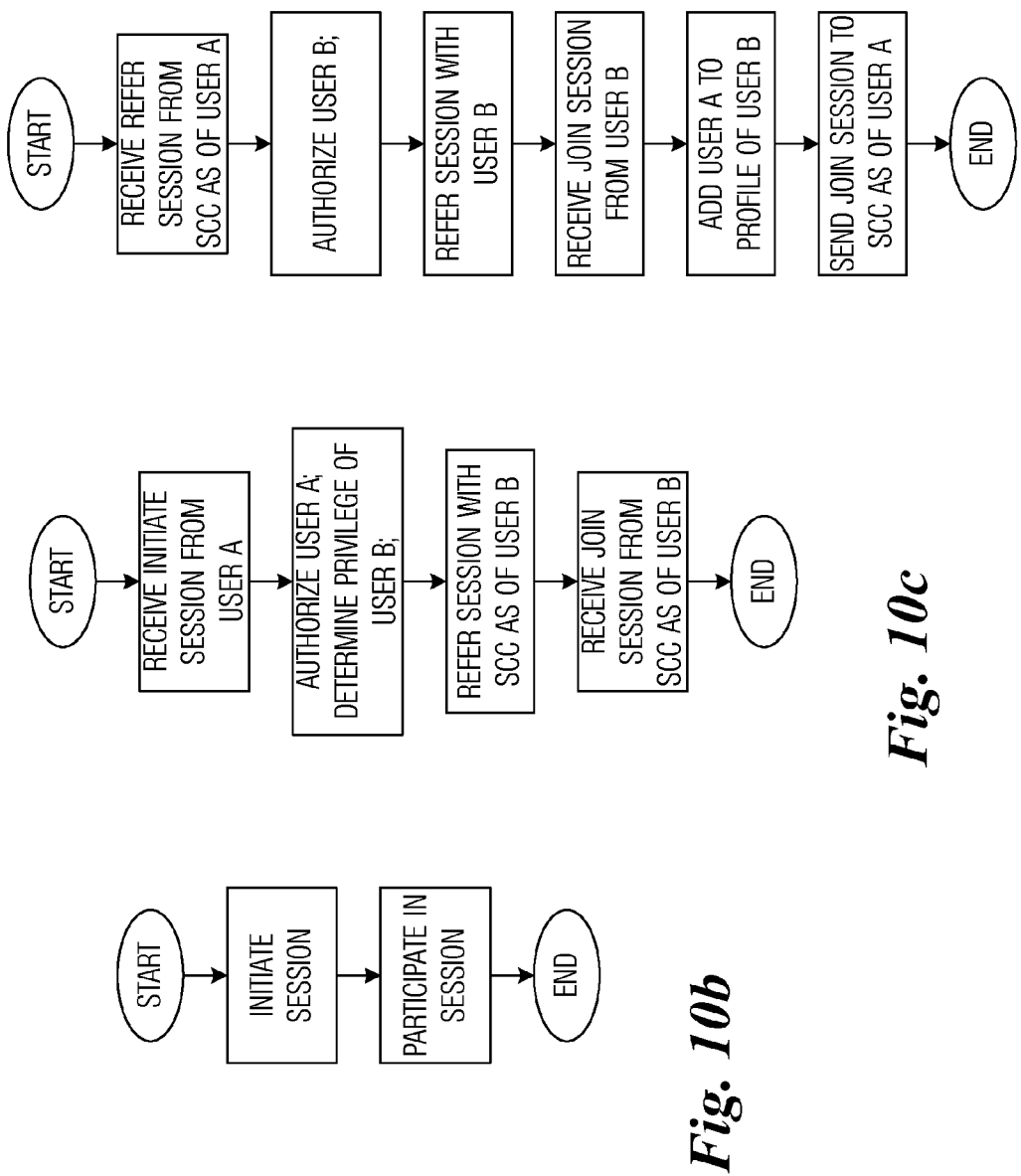
*Fig. 10e*
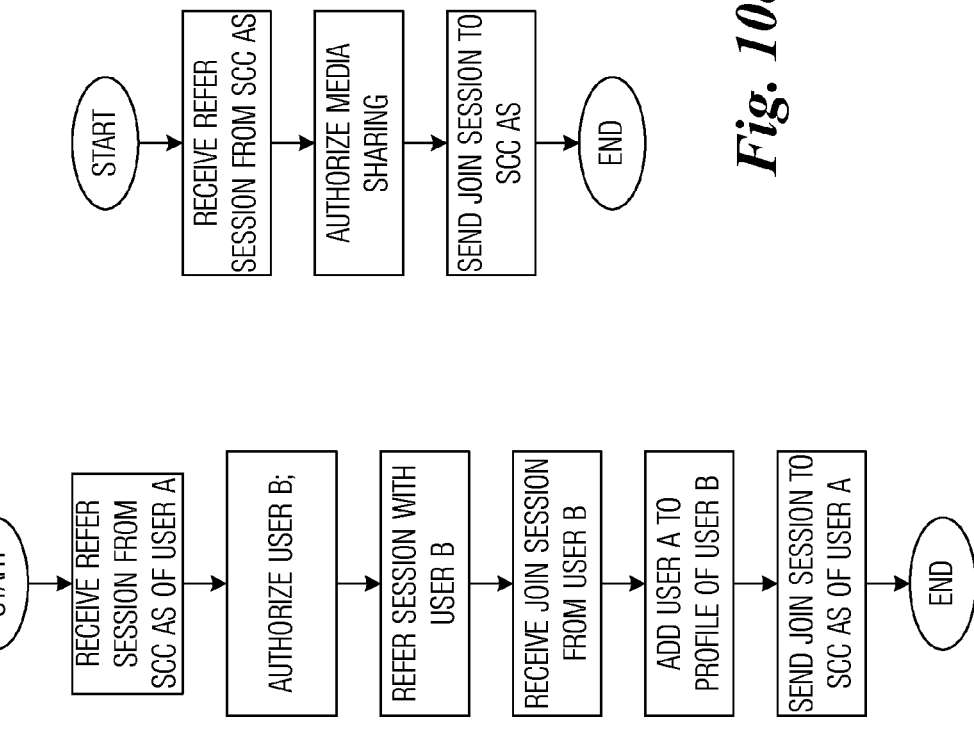
*Fig. 10d*
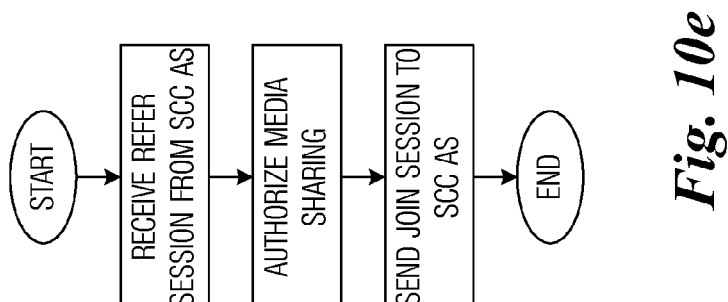
*Fig. 10c*
*Fig. 10b*

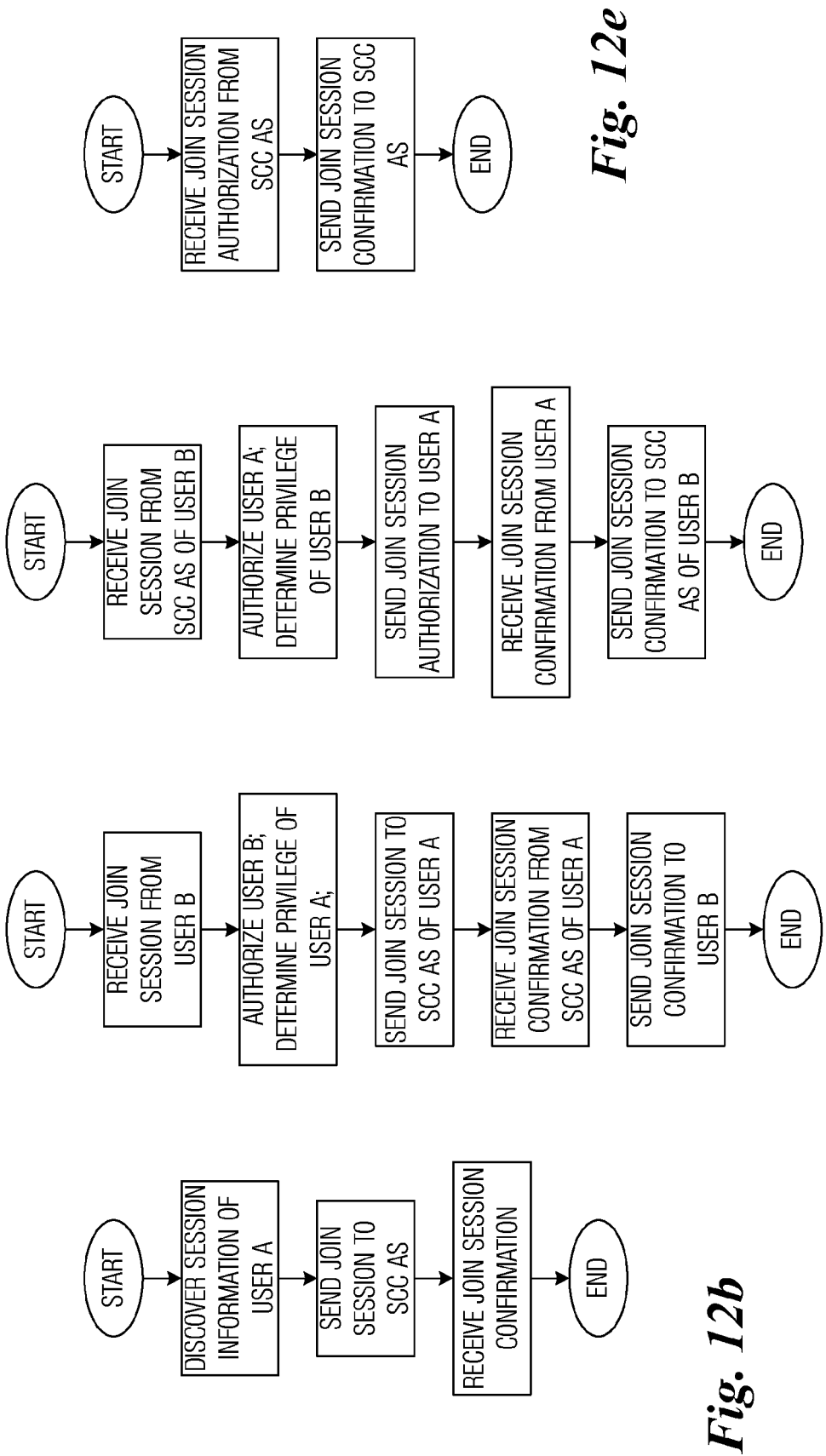

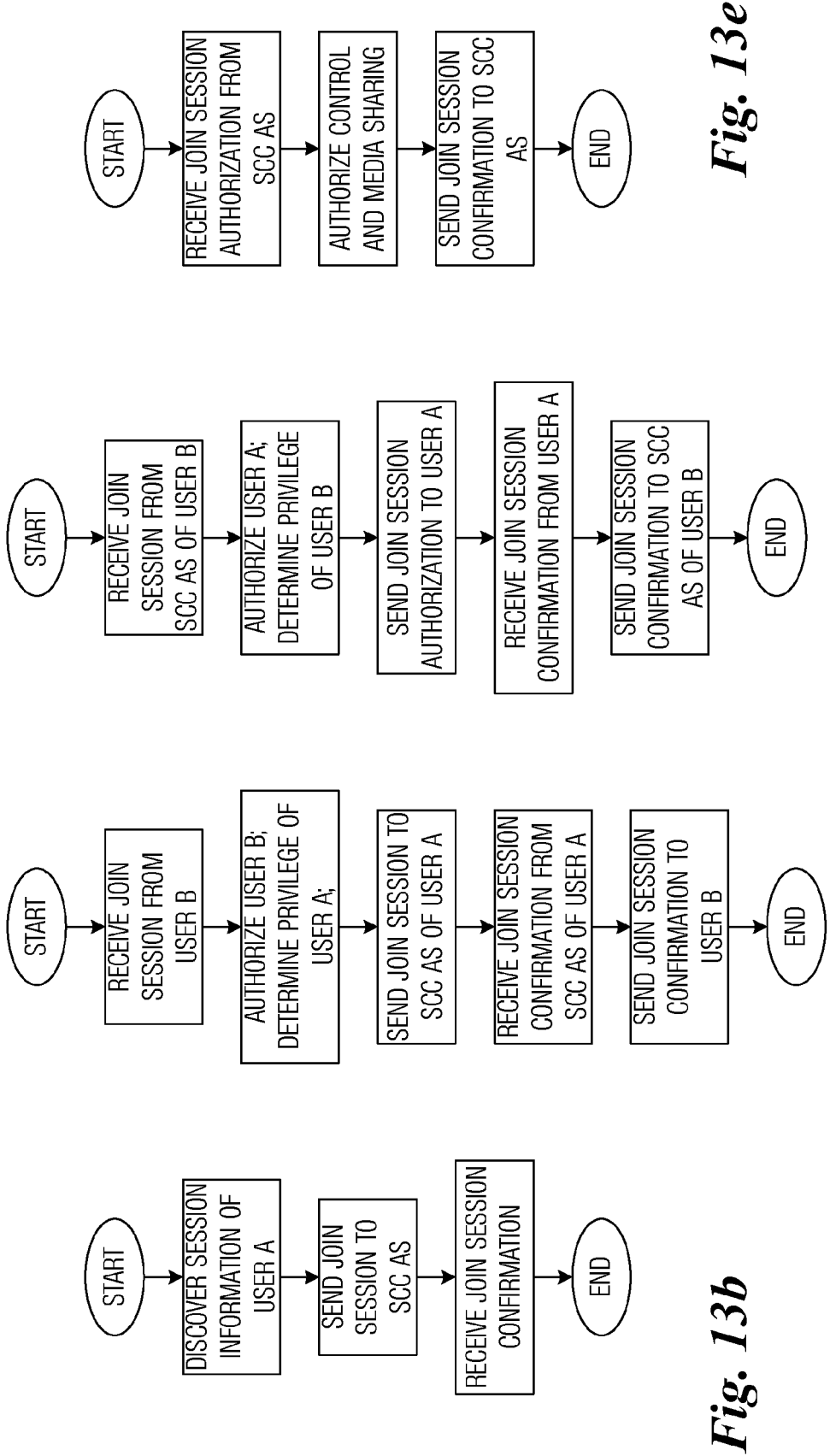

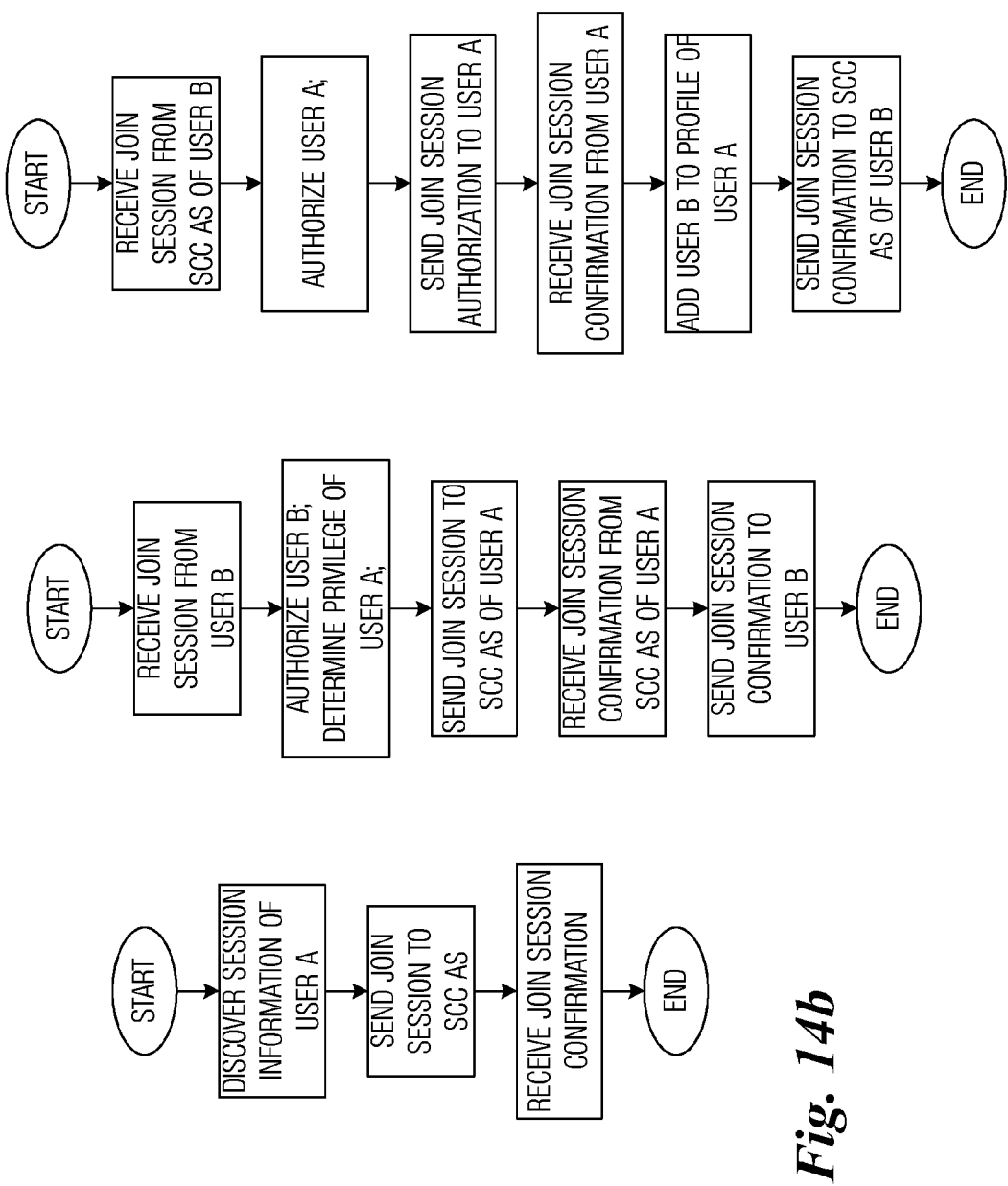

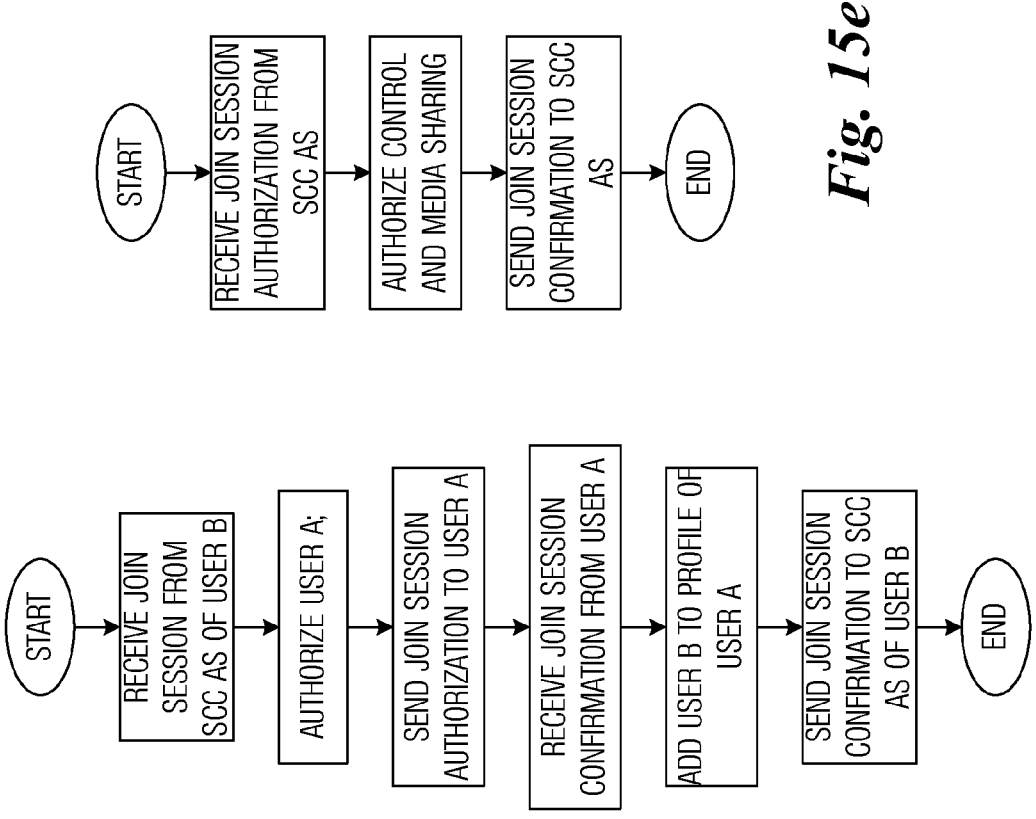
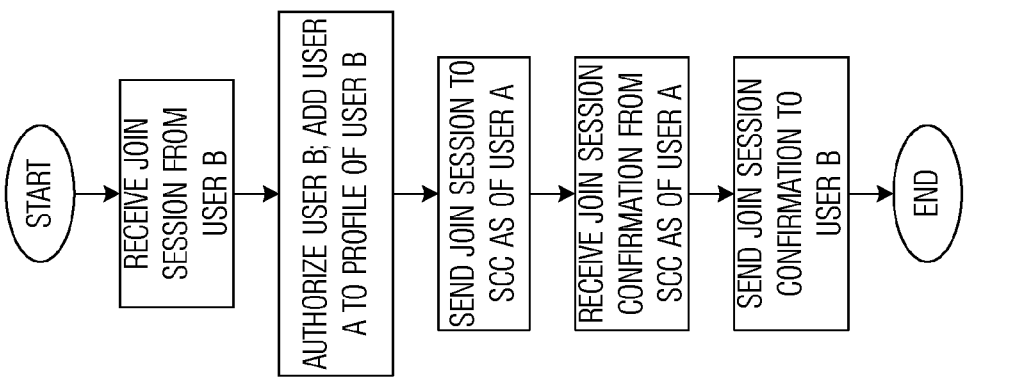
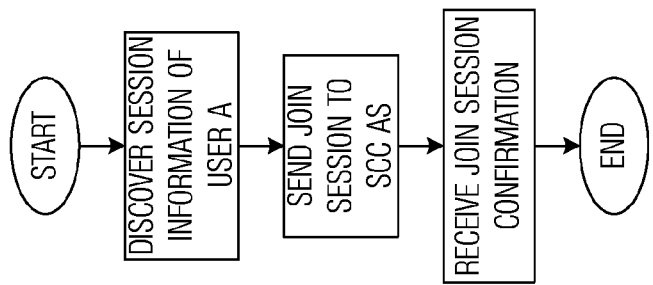

SYSTEM AND METHOD FOR SHARED MULTIMEDIA EXPERIENCES ACROSS MULTIPLE SUBSCRIPTIONS

This application claims the benefit of U.S. Provisional Application No. 61/218,633, filed on Jun. 19, 2009, entitled "Authorization Scheme for Shared Multimedia Experiences across Multiple Subscriptions," which application is hereby incorporated herein by reference.

TECHNICAL FIELD

The present invention relates generally to a system and method digital communications, and more particularly to a system and method for shared multimedia experiences across multiple subscriptions.

BACKGROUND

As mobile devices improve and include more enhanced capabilities, mobile devices have evolved to act as Internet Protocol (IP) devices. In one such system, e.g., a system employing IP Multimedia services (IMS) sessions uses a traditional signaling or bearer architecture for a local media session. The traditional IMS session is created between a User Equipment (UE) and a remote end, thereby enabling the UE to access media flows. The session control signaling flow, extends between a Call Session Control Function (CSCF), a Service Centralization Continuity Application Server (SCC AS), and a Telephony Application Server (TAS) (and/or other application servers).

Generally, the CSCF processes session initiation protocol (SIP) signaling packets in the IMS system, and the application servers host and execute a variety of services. In one embodiment, the SCC AS operates in a Back-to-Back User Agent (B2BUA) mode wherein it acts as an SIP element to mediate SIP signaling between the UE and the remote end. The SCC AS establishes an access leg using IMS procedures between the SCC AS and the CSCF on the UE side and establishes a remote leg using IMS procedures to the CSCF 110 on the remote end 104 side. Other application servers may be executed on the remote leg as part of standard service execution logic at the CSCF.

The result of an IMS session established as discussed above is a media flow and a session control signaling flow established between the UE and the remote end. Unfortunately, however, the media flow and the session control signaling flow are tied to the same device, thereby not allowing the media flow to be sent to a different device or controlled by a different device. For example, if a user is interested in watching a video, current implementations require that the media flow, e.g., the video, be sent to the same device, e.g., a wireless telephone, as is controlling the video. Moreover, when a media flow is transferred to another device, both the session control signaling flow and the media flow are transferred to the same device. This situation is not always convenient or desired by the user, who may want to control the media flow via one device, but watch or control the video on a different device, such as a computer monitor or television.

SUMMARY OF THE INVENTION

These and other problems are generally solved or circumvented, and technical advantages are generally achieved, by preferred embodiments of the present invention which provide a system and method for shared multimedia experiences across multiple subscriptions.

In accordance with a preferred embodiment of the present invention, a method for application server operations is provided. The method includes receiving a first message from a first application server at a second application server, the first message including a request to initiate a collaborative session with a first communications device and a second communications device, examining a first profile of the first communications device and a second profile of the second communications device, establishing the collaborative session with the second communications device based on the first profile of the first communications device and the second profile of the second communications device, and sending a second message to the first application server, the second message including information regarding the collaborative session.

In accordance with another preferred embodiment of the present invention, a method for application server operations is provided. The method includes receiving a first message from an applications server, the first message including a request to add a first communications device to an existing collaborative session, and examining a first profile of the first communications device and a second profile of a second communications device. The second communications device is a collaborator in the existing collaborative session. The method also includes adding the first communications device to the existing collaborative session based on the first profile of the first communications device and the second profile of the second communications device, and sending a second message to the applications server, the second message including a confirmation for the request to add the first communications device to the existing collaborative session.

In accordance with another preferred embodiment of the present invention, a method for application server operations is provided. The method includes receiving a first message from a first communications device, the first message including a request to add the first communications device to an existing collaborative session. The method also includes examining a first profile of the first communications device and a second profile of a second communications device, requesting that the first communications device be added to the existing collaborative session, receiving a response responsive to the request, and sending the response to the first communications device. The second communications device is a collaborator in the existing collaborative session.

An advantage of an embodiment is that collaborative privileges may be configured in IMS upon subscription to a service and/or updated by a subscriber at any time after subscription.

A further advantage of an embodiment is that collaborative privileges may be updated by a network during a collaborative session setup.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 5b is a flow diagram of USER operations at USER A in establishing a collaborative session between USER A and USER B, with both users sharing control and media and USER A being configured for per-session authorization by USER B;

FIG. 5c is a flow diagram of SCC AS operations at first SCC AS in establishing a collaborative session between USER A and USER B, with both users sharing control and media and USER A being configured for per-session authorization by USER B;

FIG. 5d is a flow diagram of SCC AS operations at second SCC AS in establishing a collaborative session between USER A and a USER B, with both users sharing control and media and USER A being configured for per-session authorization by USER B;

FIG. 5e is a flow diagram of USER operations at USER B in establishing a collaborative session between USER A and USER B, with both users sharing control and media and USER A being configured for per-session authorization by USER B;

FIG. 6b is a flow diagram of USER operations at USER A in establishing a collaborative session between USER A and USER B, with both users sharing control and media and USER A being configured for full collaboration privileges in a profile for USER B;

FIG. 6c is a flow diagram of SCC AS operations at first SCC AS in establishing a collaborative session between USER A and USER B, with both users sharing control and media and USER A being configured for full collaboration privileges in a profile for USER B;

FIG. 6d is a flow diagram of SCC AS operations at second SCC AS in establishing a collaborative session between USER A and a USER B, with both users sharing control and media and USER A being configured for full collaboration privileges in a profile for USER B;

FIG. 6e is a flow diagram of USER operations at USER B in establishing a collaborative session between USER A and USER B, with both users sharing control and media and USER A being configured for full collaboration privileges in a profile for USER B;

FIG. 7b is a flow diagram of USER operations at USER A in establishing a collaborative session between USER A and USER B, with both users sharing control and media and USER A and USER B not being configured in each other's profiles;

FIG. 7c is a flow diagram of SCC AS operations at first SCC AS in establishing a collaborative session between USER A and USER B, with both users sharing control and media and USER A and USER B not being configured in each other's profiles;

FIG. 7d is a flow diagram of SCC AS operations at second SCC AS in establishing a collaborative session between USER A and a USER B, with both users sharing control and media and USER A and USER B not being configured in each other's profiles;

FIG. 7e is a flow diagram of USER operations at USER B in establishing a collaborative session between USER A and USER B, with both users sharing control and media and USER A and USER B not being configured in each other's profiles;

FIG. 8b is a flow diagram of USER operations at USER A in establishing a collaborative session using USER B's device for media, USER A being configured as a controller in a profile for USER B, and USER A provided default authorization by USER B;

FIG. 8c is a flow diagram of SCC AS operations at first SCC AS in establishing a collaborative session using USER B's device for media, USER A being configured as a controller in a profile for USER B, and USER A provided default authorization by USER B;

FIG. 8d is a flow diagram of SCC AS operations at second SCC AS in establishing a collaborative session using USER B's device for media, USER A being configured as a controller in a profile for USER B, and USER A provided default authorization by USER B;

FIG. 8e is a flow diagram of USER operations at USER B in establishing a collaborative session using USER B's device for media, USER A being configured as a controller in a profile for USER B, and USER A provided default authorization by USER B;

FIG. 10b is a flow diagram of USER operations at USER A in establishing a collaborative session using USER B's device for media, USER B being configured to accept solicitations from new collaborators, and USER B being configured as a media source in the profile of USER A;

FIG. 10c is a flow diagram of SCC AS operations at first SCC AS in establishing a collaborative session using USER B's device for media, USER B being configured to accept solicitations from new collaborators, and USER B being configured as a media source in the profile of USER A;

FIG. 10d is a flow diagram of SCC AS operations at second SCC AS in establishing a collaborative session using USER B's device for media, USER B being configured to accept solicitations from new collaborators, and USER B being configured as a media source in the profile of USER A;

FIG. 10e is a flow diagram of USER operations at USER B in establishing a collaborative session using USER B's device for media, USER B being configured to accept solicitations from new collaborators, and USER B being configured as a media source in the profile of USER A;

FIG. 12b is a flow diagram of USER operations at USER B in joining an ongoing collaborative session with USER A, with USER A provided default authorization by USER B and both USER A and USER B may be configured for full collaboration privileges in each others profiles;

FIG. 12c is a flow diagram of SCC AS operations at second SCC AS in joining an ongoing collaborative session with USER A, with USER A provided default authorization by USER B and both USER A and USER B may be configured for full collaboration privileges in each others profiles;

FIG. 12d is a flow diagram of SCC AS operations at first SCC AS in joining an ongoing collaborative session with USER A, with USER A provided default authorization by USER B and both USER A and USER B may be configured for full collaboration privileges in each others profiles;

FIG. 12e is a flow diagram of USER operations at USER A in joining an ongoing collaborative session with USER A, with USER A provided default authorization by USER B and both USER A and USER B may be configured for full collaboration privileges in each others profiles;

FIG. 13b is a flow diagram of USER operations at USER B in joining an ongoing collaborative session with USER A, with USER A being configured for per-session authorization by USER B and both USER A and USER B may be configured for full collaboration privileges in each others profiles;

FIG. 13c is a flow diagram of SCC AS operations at second SCC AS in joining an ongoing collaborative session with USER A, with USER A being configured for per-session authorization by USER B and both USER A and USER B may be configured for full collaboration privileges in each others profiles;

FIG. 13d is a flow diagram of SCC AS operations at first SCC AS in joining an ongoing collaborative session with USER A, with USER A being configured for per-session authorization by USER B and both USER A and USER B may be configured for full collaboration privileges in each others profiles;

FIG. 13e is a flow diagram of USER operations at USER A in joining an ongoing collaborative session with USER A, with USER A being configured for per-session authorization by USER B and both USER A and USER B may be configured for full collaboration privileges in each others profiles;

FIG. 14b is a flow diagram of USER operations at USER B in joining an ongoing collaborative session with USER A, with USER A being configured for accepting new solicitations and USER A may be configured for full collaboration privileges in the profile of USER B;

FIG. 14c is a flow diagram of SCC AS operations at second SCC AS in joining an ongoing collaborative session with USER A, with USER A being configured for accepting new solicitations and USER A may be configured for full collaboration privileges in the profile of USER B;

FIG. 14d is a flow diagram of SCC AS operations at first SCC AS in joining an ongoing collaborative session with USER A, with USER A being configured for accepting new solicitations and USER A may be configured for full collaboration privileges in the profile of USER B;

FIG. 14e is a flow diagram of USER operations at USER A in joining an ongoing collaborative session with USER A, with USER A being configured for accepting new solicitations and USER A may be configured for full collaboration privileges in the profile of USER B;

FIG. 15b is a flow diagram of USER operations at USER B in joining an ongoing collaborative session with USER A, USER A and USER B not being configured in each others profiles, and USER A and USER B may be configured to accept in-session profile updates and new solicitations;

FIG. 15c is a flow diagram of SCC AS operations at second SCC AS in joining an ongoing collaborative session with USER A, USER A and USER B not being configured in each others profiles, and USER A and USER B may be configured to accept in-session profile updates and new solicitations;

FIG. 15d is a flow diagram of SCC AS operations at first SCC AS in joining an ongoing collaborative session with USER A, USER A and USER B not being configured in each others profiles, and USER A and USER B may be configured to accept in-session profile updates and new solicitations; and FIG. 15e is a flow diagram of USER operations at USER A in joining an ongoing collaborative session with USER A, USER A and USER B not being configured in each others profiles, and USER A and USER B may be configured to accept in-session profile updates and new solicitations.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a multimedia session with remotely distributed users using a 3GPP IMS compliant communications system. The invention may also be applied, however, to multimedia sessions with remotely distributed users using other communications systems with support for collaborative operation.

Figure 1:
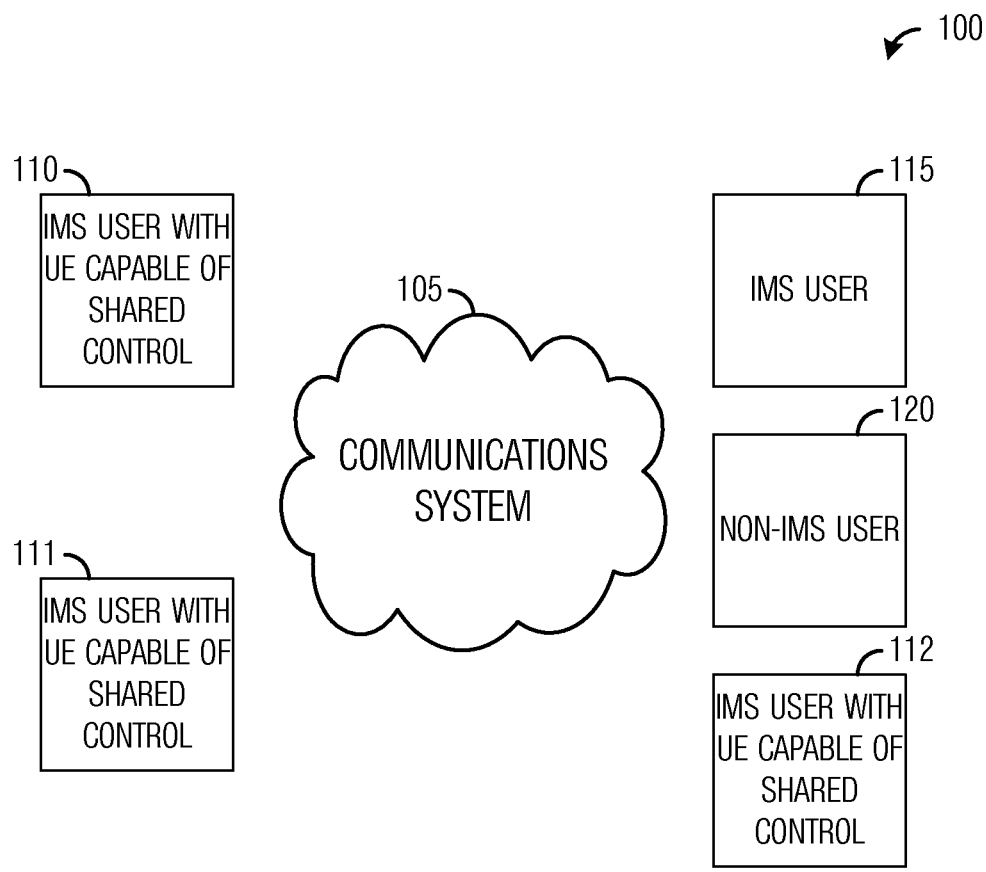
FIG. 1 is a diagram of a high-level view of a collaborative session with remotely distributed users.

FIG. 1 illustrates a high-level view of a collaborative session 100 with remotely distributed users. Collaborative session 100 includes a number of users communicating together over a communications system 105. Communications system 105 may be made up of a single communications system or multiple communications systems. For example, a 3GPP IMS compliant communications system may provide connectivity for control, media, and data for users with compatible communications devices, while for users with legacy equipment, a public switched telephone network (PSTN) may be available, while for users that are relatively close together, WiFi or other short-range wireless communications systems may be used to provided connectivity.

The users of collaborative session 100 may have different characteristics and capabilities. Some of the users, e.g., users 110 through 112, may have IMS compliant communications devices that are capable of shared control, while some of the users, e.g., user 115, may have IMS compliant communications devices that are not capable of shared control, while some of the users, e.g., user 120, may not have IMS compliant communications devices at all.

Users 110 through 112 may participate in sharing of control, data, and media in collaborative session 100, while user 115 may participate in sharing of data and media and may assume control of collaborative session 100. User 120 may participate in sharing of data and media but may not assume control of collaborative session 100.

A collaborative services community (CSC) may be formed dynamically by a collection of collaborative service users engaged in a collaborative service comprising a collaborative session or a set of collaborative sessions linked to each other. A master service centralization and continuity (SCC) application server (AS) is assigned to a CSC upon setup of a new collaborative session or upon merger of two or more standard IMS sessions to form a collaborative session, or merger of two or collaborative sessions. Other SCC AS involved in a collaborative session acts in a slave mode, simply relaying service controls to the master SCC AS.

Figure 2A:
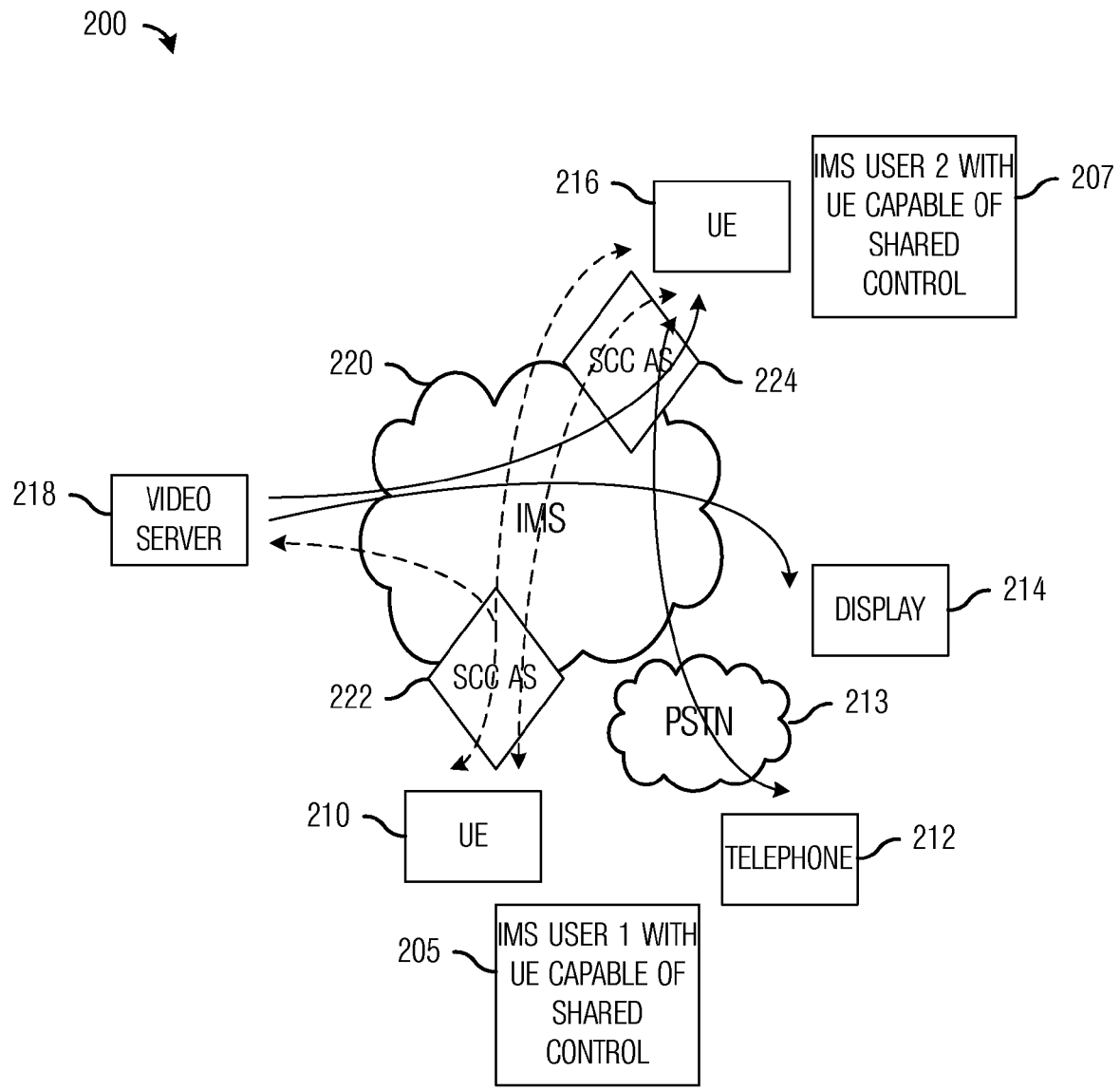
FIG. 2a is a diagram of a first collaborative session.

FIG. 2a illustrates a first collaborative session 200. First collaborative session 200 includes a first IMS user "IMS USER 1" 205 with a UE 210 capable of shared control, a telephone 212 that is connected to a public switched telephone network (PSTN) 213, and a video display 214. First collaborative session 200 also includes a second IMS user "IMS USER 2" 207 with a UE 216 capable of shared control. Also included in first collaborative session 200 may be a video server 218 that may deliver streaming video to users, such as first IMS user 205 and second IMS user 207.

First IMS user 205 may initiate first collaborative session 200 with second IMS 207 through an IMS communications system 220 with a SCC AS 222 for first IMS user 205 serving as a master AS and a SCC AS 224 for second IMS user 207 serving as a slave AS. First IMS user 205 may configure first collaborative session 200 so that video from video server 218 may be displayed on display 214 through IMS 220 and a voice connection may be established between telephone 212 and UE 216 through PSTN 213. As shown in FIG. 2a, an exchange of control information is illustrated as arrowed dashed lines and an exchange of video/voice information is illustrates as arrowed solid lines. First IMS user 205 may control the streaming video and the voice connection using UE 210. Controls for first IMS user 205 and second IMS user 207 may be synchronized so that seamless video and voice sessions are experienced by both. A single SCC AS, namely SCC AS 222, may be used to arbitrate first collaborative session 200 control signaling so that control is synchronized for the service.

Both first IMS user 205 and second IMS user 207 may be authorized to share control of first collaborative session 200.

Figure 2B:
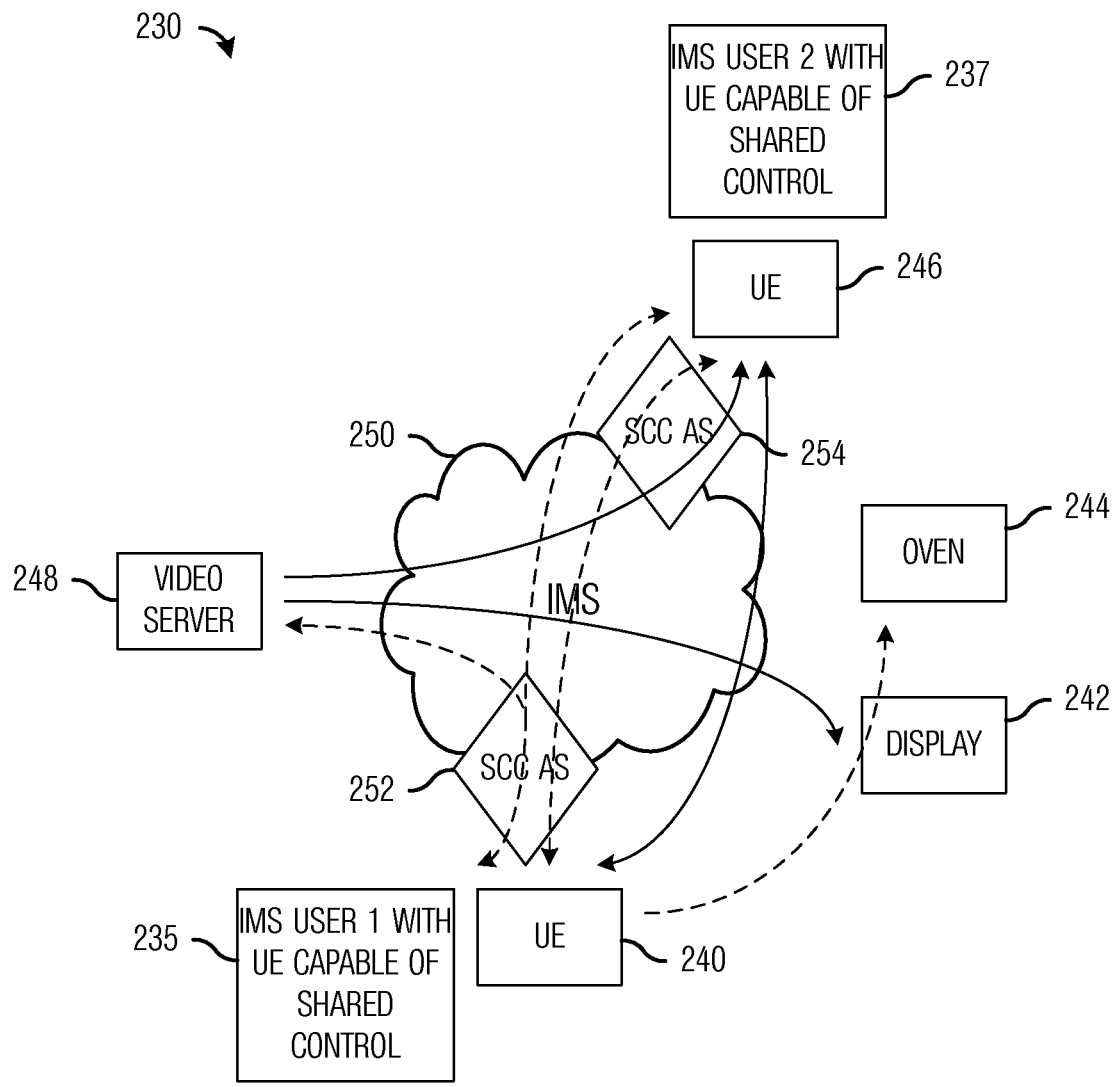
FIG. 2b is a diagram of a second collaborative session.

FIG. 2b illustrates a second collaborative session 230. Second collaborative session 230 includes a first IMS user "IMS USER 1" 235 with a UE 240 capable of shared control, a video display 242, and an oven 244 with communications system connectivity and control. Second collaborative session 230 also includes a second IMS user "IMS USER 2" 237 with a UE 246 capable of shared control. Also included in second collaborative session 230 may be a video server 248 that may deliver streaming video to users, such as first IMS user 235 and second IMS user 237.

As an example, first IMS user 235 may be utilizing oven 244 to cook food when second IMS user 237 calls to discuss a video. First IMS user 235 initiates second collaborative session 230 with second IMS user 237 through an IMS communications system 250 with a SCC AS 252 for first IMS user 235 serving as a master AS and a SCC AS 254 for second IMS user 237 serving as a slave AS. First IMS user 235 may configure second collaborative session 230 so that video from video server 248 displays on display 242 and a voice connection is established between UE 240 and UE 246. As shown in FIG. 2b, an exchange of control information is illustrated as arrowed dashed lines and an exchange of video/voice information is illustrates as arrowed solid lines.

While watching the video, first IMS user 235 notices that the food in oven 244 will burn unless oven 244 is turned off, so first IMS user 235 turns off oven 244 using UE 240 to control oven 244. Since oven 244 and first IMS user 235 are co-located, control of oven 244 by first IMS user 235 may not need to go through IMS communications system 250. Instead, a short-range communications system, such as WiFi or a femto network may be sufficient. A single SCC AS, namely SCC AS 252, may be used to arbitrate second collaborative session 230 control signaling so that control is synchronized for the service.

Both first IMS user 235 and second IMS user 237 may be authorized to share control of second collaborative session 230.

Figure 2C:
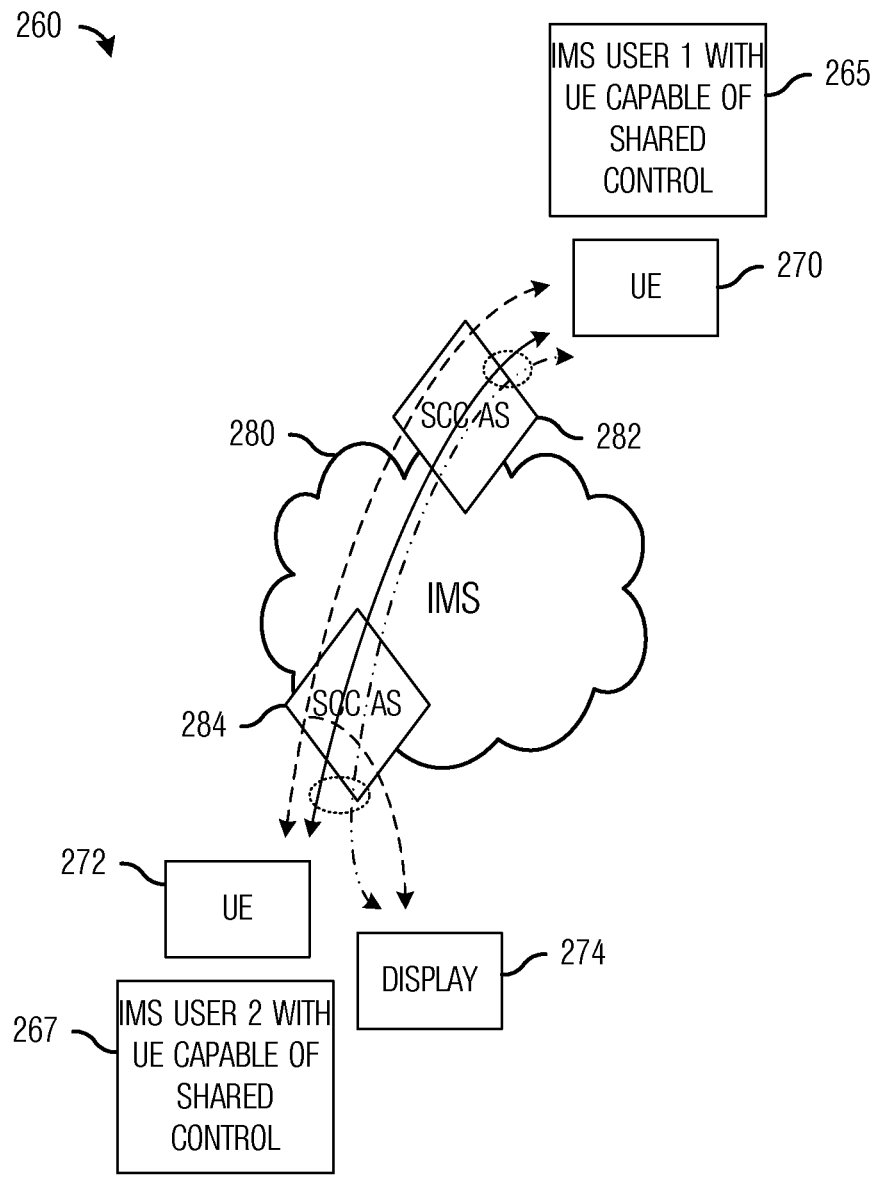
FIG. 2c is a diagram of a third collaborative session.

FIG. 2c illustrates a third collaborative session 260. Third collaborative session 260 includes a first IMS user "IMS USER 1" 265 with a UE 270 capable of shared control. Third collaborative session 260 also includes a second IMS user "IMS USER 2" 267 with a UE 272 capable of shared control and a display 274.

As an example, first IMS user 265 may initiate third collaborative session 260 with second IMS user 267 through an IMS communications system 280 with a SCC AS 282 for first IMS user 260 serving as a master AS and a SCC AS 284 for second IMS user 267. First IMS user 265 may configure third collaborative session 260 so that images/video from UE 270 may be shared with display 274 and voice from UE 270 may be shared with UE 272. As shown in FIG. 2c, an exchange of control information is illustrated as arrowed dashed lines, an exchange of video information is illustrates as arrowed dashed-dotted lines, and an exchange of voice information is illustrates as arrowed dashed lines.

A single SCC AS, namely SCC AS 282, may be used to arbitrate third collaborative session 260 control signaling so that control is synchronized for the service. First IMS user 265 may be authorized to use devices of second IMS user 267 for media in third collaborative session 260, which may be controlled by first IMS user 265.

Figure 3A:
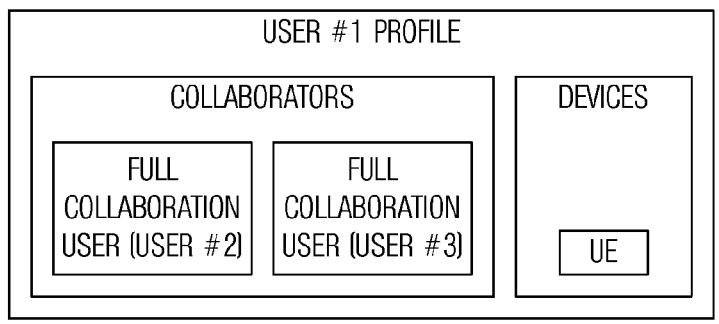
FIGS. 3a through 3d are diagrams of IMS subscriber profiles for a number of IMS users.
Figure 3B:
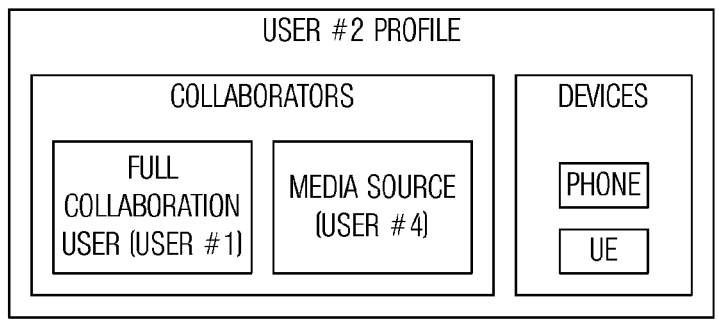

FIGS. 3a through 3d illustrate IMS subscriber profiles for several IMS users. FIG. 3a illustrates an IMS subscriber profile for IMS user #1. IMS user #1 may have as collaborators, a first full collaboration user (IMS user #2) and a second full collaboration user (IMS user #3). As far as devices, IMS user #1 makes use of only a UE. FIG. 3b illustrates an IMS subscriber profile for IMS user #2. IMS user #2 may have as collaborators, a full collaboration user (IMS user #1) and a media source (IMS user #4). Note that since IMS user #1 is a collaborator of IMS user #2, IMS user #2 is also a collaborator of IMS user #1. IMS user #2 has a both a phone and a UE.

Figure 3C:
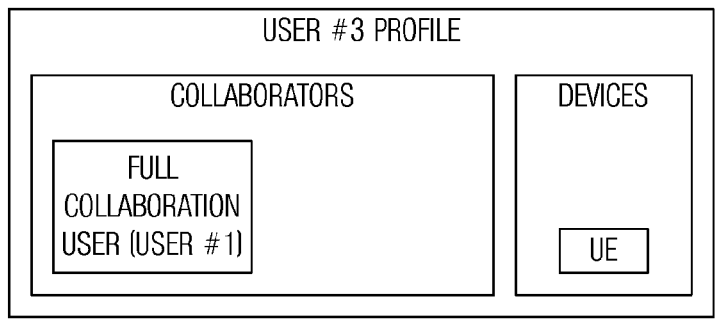
Figure 3D:
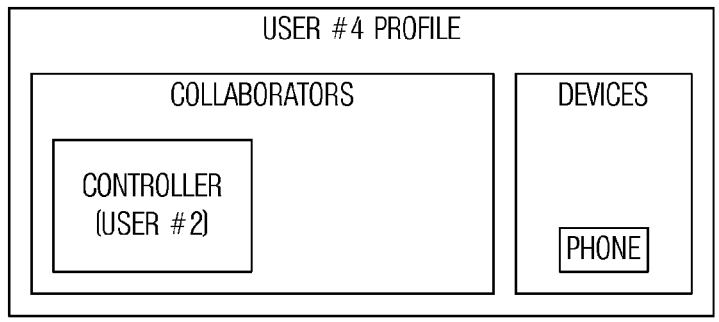

FIG. 3c illustrates an IMS subscriber profile for IMS user #3. IMS user #3 may have as collaborator a full collaboration user (IMS user #1) and a UE as a device. FIG. 3d illustrates an IMS subscriber profile for IMS user #4. IMS user #4 may have as collaborator a controller (IMS user #2) and a phone as a device.

Referring back to FIG. 3b, IMS user #4 is listed as a media source for IMS user #2 in IMS user #2's list of collaborators.

Correspondingly, IMS user #2 is listed as a controller for IMS user #4 in IMS user #4's list of collaborators.

In general, an IMS user's subscriber profile may include zero or more collaborators with collaboration privileges determined by a scope of collaboration. Exemplary scopes of collaboration include:

Full collaboration privilege: Full media and control sharing with collaborator(s); both may use each other's media in collaborative session(s) that they control and/or share and transfer control of collaborative session(s);

Controller privilege: A collaborator may use the subscriber's (the IMS user) device as a media source to provide media for a collaborative session controlled by the collaborator;

Media source privilege: A collaborator's device may be used to provide media for a collaborative session that the subscriber (the IMS user) controls.

Furthermore, the subscriber may request to receive authorization requests upon collaborative session setup involving a particular collaborator.

According to an embodiment, collaboration privileges may be configured in IMS (using an application server (AS) or a home subscriber server (HSS)) upon subscription and/or updated by the subscriber anytime after the subscription. Collaboration privileges may also be updated by the network (upon consent from the subscriber and/or collaborator) during setup of a collaborative session. Collaboration privileges may be created statically during subscriber provision or subscriber input after subscriber provision and/or created and updated dynamically during a setup of a collaborative session.

Figure 4A:
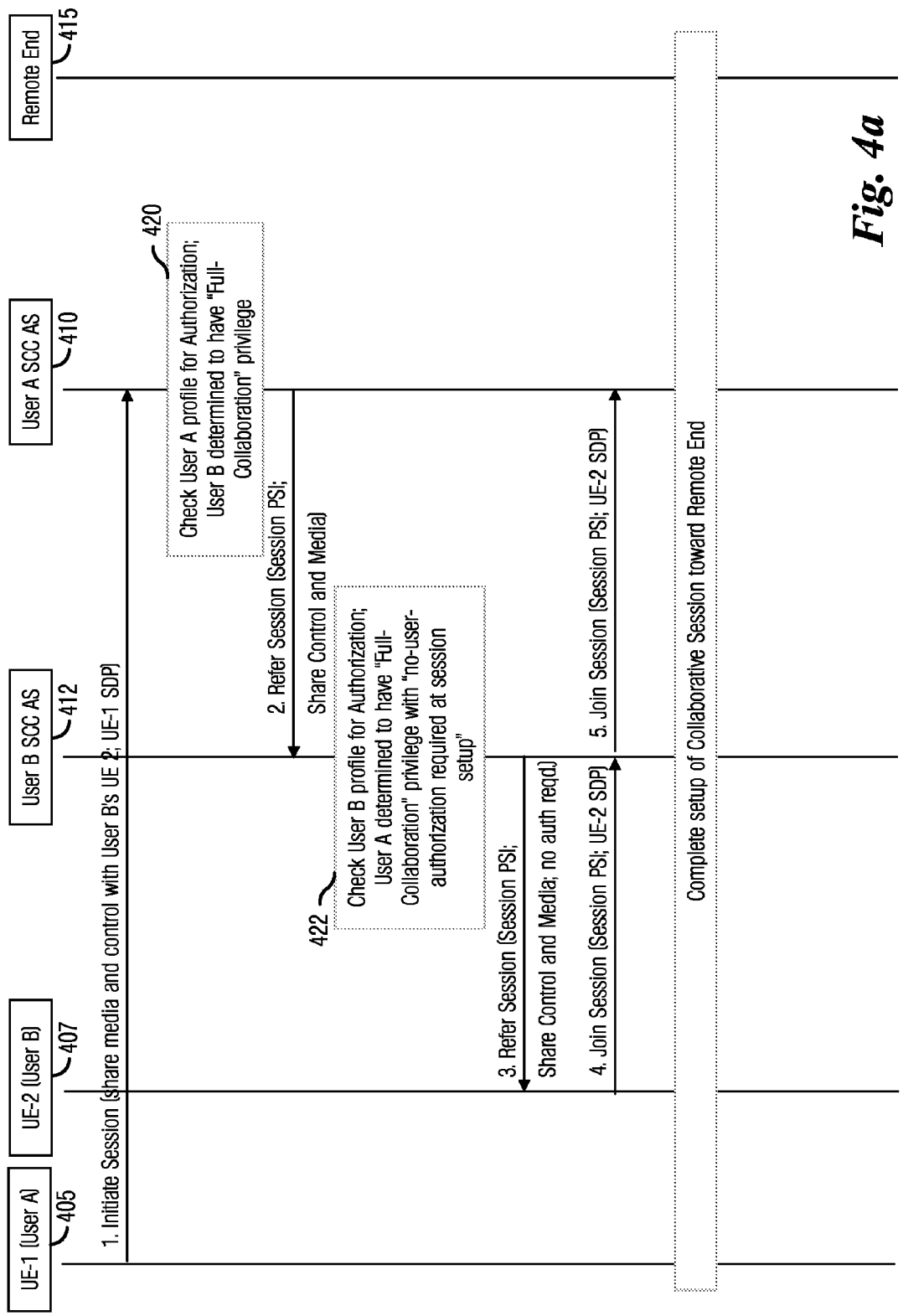
FIG. 4a is a diagram of a message exchange in establishing a collaborative session between a USER A and a USER B, with both users sharing control and media and USER A provided default authorization by USER B. USER A and USER B may be configured for full collaboration in each other's profiles.

FIG. 4a illustrates a message exchange in establishing a collaborative session between a USER A and a USER B, with both users sharing control and media and USER A provided default authorization by USER B. USER A and USER B may be configured for full collaboration in each other's profiles. As shown in FIG. 4a, the message exchange in establishing a collaborative session involves messages between USER A 405, USER B 407, a first SCC AS 410 serving USER A 405, a second SCC AS 412 serving USER B 407, and remote end users 415.

The message exchange may begin with USER A 405 initiating the collaborative session (shown as event #1). In the collaborative session USER A 405 intends to share media and control with USER B 407. USER A 405 may initiate the collaborative session by transmitting an INITIATE SESSION message or equivalent message to first SCC AS 410. First SCC AS 410 may check a profile of USER A 405 for authorization as well as to determine if USER B 407 has sufficient privilege to share media and control (block 420). According to an embodiment, USER B 407 may have sufficient privilege to share media and control if USER B 407 has full collaboration privilege. First SCC AS 410 may transmit a session refer message to second SCC AS 412 which is serving USER B 407 (shown as event #2). The session refer message may be in the form of a REFER SESSION message or equivalent message.

Second SCC AS 412 may check a profile of USER B 407 for authorization as well as to determine if USER A 405 has sufficient privilege to share media and control (block 422). According to an embodiment, USER A 405 may have sufficient privilege to share media and control if USER A 405 has full collaboration privilege. Furthermore, second SCC AS 412 may determine that USER A 405 has a "no-user-authorization required at session setup" privilege.

Second SCC AS 412 may send a session refer message to USER B 407 (shown as event #3). The session refer message may be in the form of a REFER SESSION message or equivalent message. USER B 407 may respond to the session refer message with a join session message sent to second SCC AS 412 (shown as event #4). The join session message may be in the form of a JOIN SESSION message or equivalent message.

Second SCC AS 412, upon receipt of the join session message from USER B 407, may send a join session message of its own to first SCC AS 410 (shown as event #5). The join session message may be in the form of a JOIN SESSION message or equivalent message. USER A 405, USER B 407, first SCC AS 410, second SCC AS 412, and remote end users 415 may participate in further message exchanges to complete the setup of the collaborative session with remote end users 415.

Figures 4B, 4C, 4D, 4E:
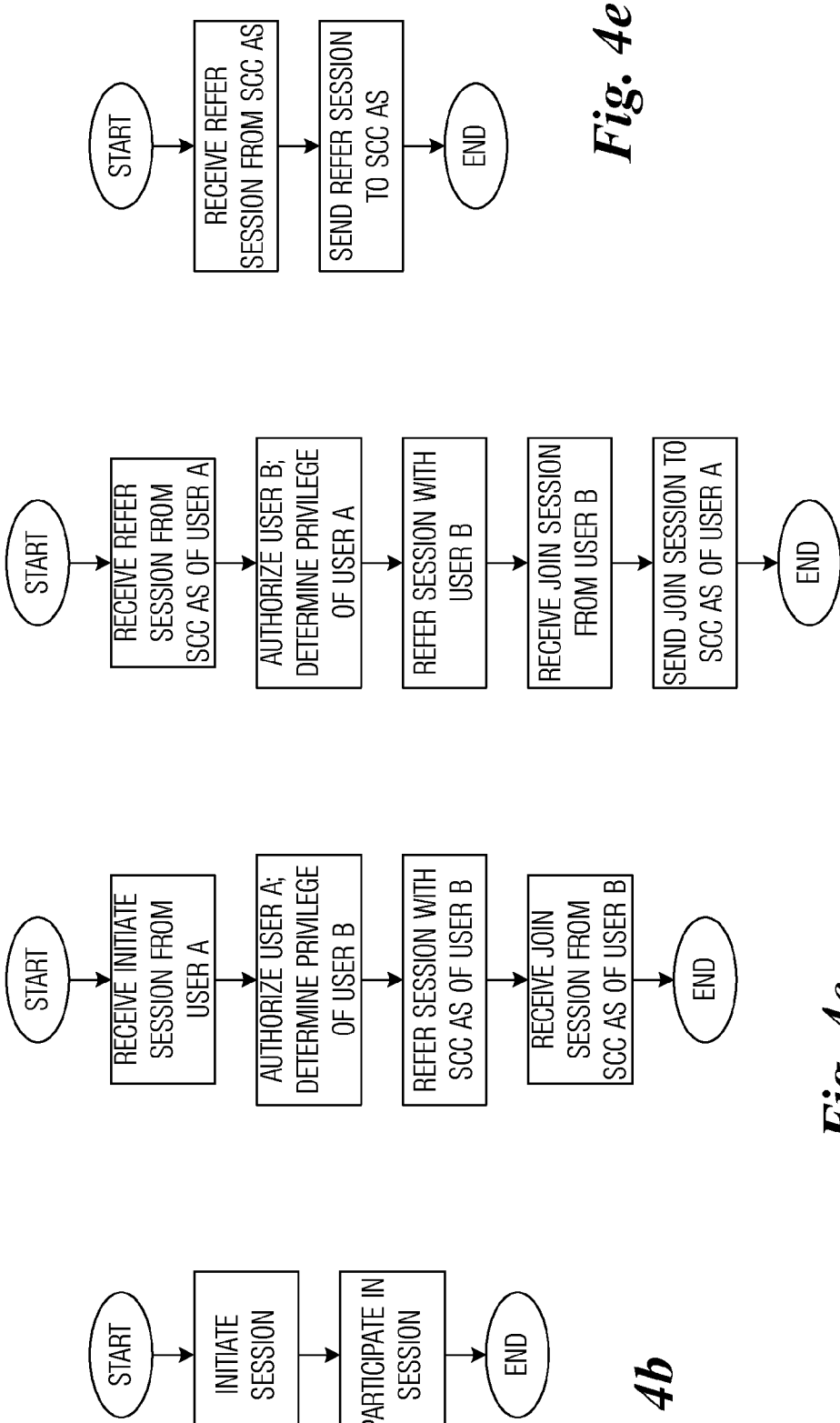
FIG. 4b is a flow diagram of USER operations at USER A in establishing a collaborative session between USER A and USER B, with both users sharing control and media and USER A provided default authorization by USER B.
FIG. 4c is a flow diagram of SCC AS operations at first SCC AS in establishing a collaborative session between USER A and USER B, with both users sharing control and media and USER A provided default authorization by USER B.
FIG. 4d is a flow diagram of SCC AS operations at second SCC AS in establishing a collaborative session between USER A and USER B, with both users sharing control and media and USER A provided default authorization by USER B.
FIG. 4e is a flow diagram of USER operations at USER B in establishing a collaborative session between USER A and USER B, with both users sharing control and media and USER A provided default authorization by USER B.

FIG. 4b illustrates a flow diagram of USER operations at USER A 405 in establishing a collaborative session between USER A 405 and USER B 407, with both users sharing control and media and USER A 405 provided default authorization by USER B 407. FIG. 4c illustrates a flow diagram of SCC AS operations at first SCC AS 410 in establishing a collaborative session between USER A 405 and USER B 407, with both users sharing control and media and USER A 405 provided default authorization by USER B 407. FIG. 4d illustrates a flow diagram of SCC AS operations at second SCC AS 412 in establishing a collaborative session between USER A 405 and USER B 407, with both users sharing control and media and USER A 405 provided default authorization by USER B 407. FIG. 4e illustrates a flow diagram of USER operations at USER B 407 in establishing a collaborative session between USER A 405 and USER B 407, with both users sharing control and media and USER A 405 provided default authorization by USER B 407.

Figure 5A:
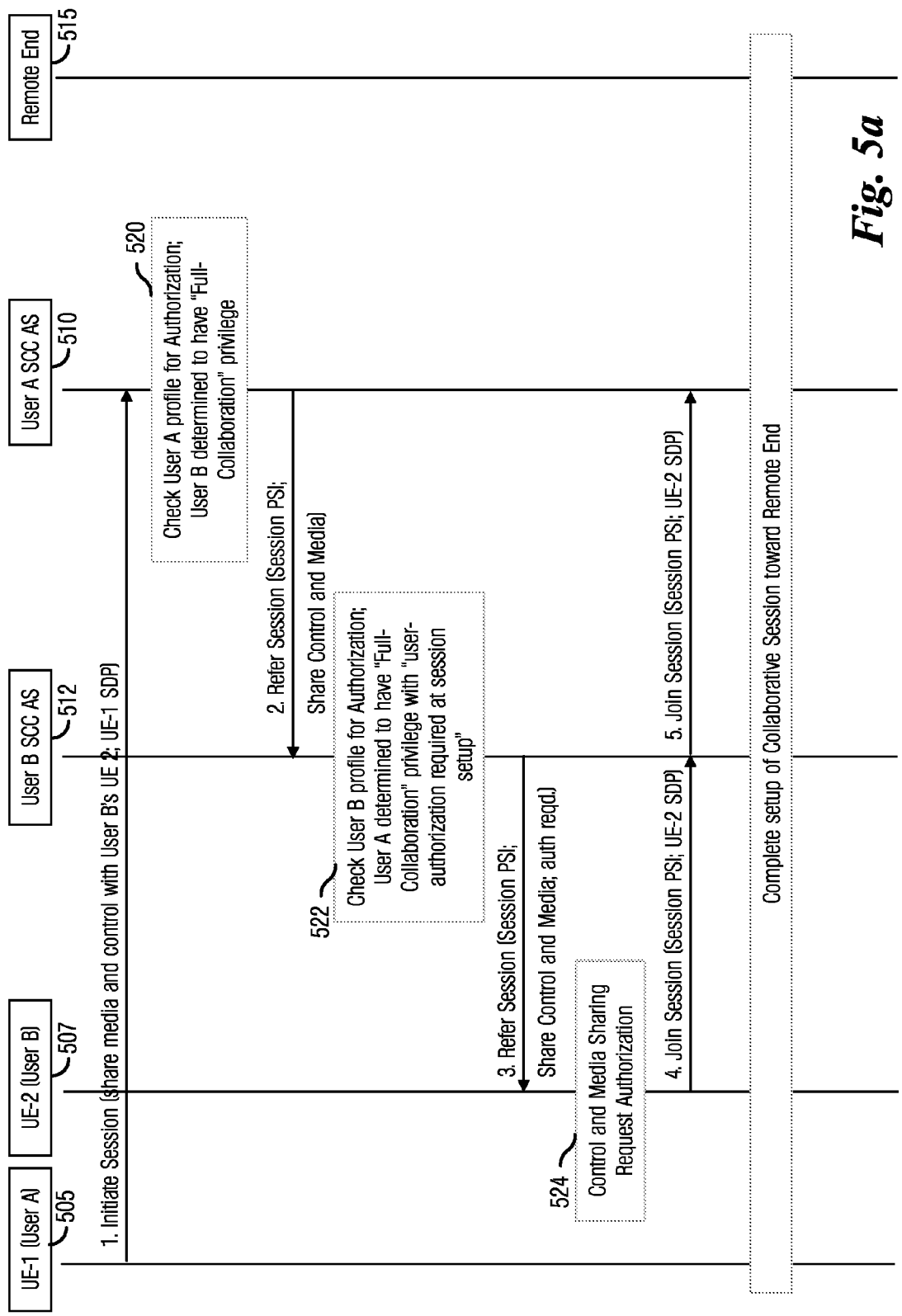
FIG. 5a is a diagram of a message exchange in establishing a collaborative session between a USER A and a USER B, with both users sharing control and media and USER A being configured for per-session authorization by USER B.

FIG. 5a illustrates a message exchange in establishing a collaborative session between a USER A and a USER B, with both users sharing control and media and USER A being configured for per-session authorization by USER B. USER A and USER B may be configured for full collaboration in each other's profiles. As shown in FIG. 5a, the message exchange in establishing a collaborative session involves messages between USER A 505, USER B 507, a first SCC AS 510 serving USER A 505, a second SCC AS 512 serving USER B 507, and remote end users 515.

The message exchange may begin with USER A 505 initiating the collaborative session (shown as event #1). In the collaborative session USER A 505 intends to share media and control with USER B 507. USER A 505 may initiate the collaborative session by transmitting an INITIATE SESSION message or equivalent message to first SCC AS 510. First SCC AS 510 may check a profile of USER A 505 for authorization as well as determine if USER B 507 has sufficient privilege to share media and control (block 520). According to an embodiment, USER B 507 may have sufficient privilege to share media and control if USER B 507 has full collaboration privilege. First SCC AS 510 may transmit a session refer message to second SCC AS 512 which is serving USER B 507 (shown as event #2). The session refer message may be in the form of a REFER SESSION message or equivalent message.

Second SCC AS 512 may check a profile of USER B 507 for authorization as well as determine if USER A 505 has sufficient privilege to share media and control (block 522). According to an embodiment, USER A 505 may have sufficient privilege to share media and control if USER A 505 has full collaboration privilege. Furthermore, second SCC AS 512 may determine that USER A 505 has a "user-authorization required at session setup" privilege.

Second SCC AS 512 may send a session refer message to USER B 507 (shown as event #3). The session refer message may be in the form of a REFER SESSION message or equivalent message. USER B 507 may perform a control and media sharing request authorization (block 524). Assuming that the control and media sharing request authorization succeeded, USER B 507 may respond to the session refer message with a join session message sent to second SCC AS 512 (shown as event #4). The join session message may be in the form of a JOIN SESSION message or equivalent message.

Second SCC AS 512, upon receipt of the join session message from USER B 507, may send a join session message of its own to first SCC AS 510 (shown as event #5). The join session message may be in the form of a JOIN SESSION message or equivalent message. USER A 505, USER B 507, first SCC AS 510, second SCC AS 512, and remote end users 515 may participate in further message exchanges to complete the setup of the collaborative session with remote end users 515.

FIG. 5b illustrates a flow diagram of USER operations at USER A 505 in establishing a collaborative session between USER A 505 and USER B 507, with both users sharing control and media and USER A 505 being configured for per-session authorization by USER B 507. FIG. 5c illustrates a flow diagram of SCC AS operations at first SCC AS 510 in establishing a collaborative session between USER A 505 and USER B 507, with both users sharing control and media and USER A 505 being configured for per-session authorization by USER B 507. FIG. 5d illustrates a flow diagram of SCC AS operations at second SCC AS 512 in establishing a collaborative session between USER A 505 and a USER B 507, with both users sharing control and media and USER A 505 being configured for per-session authorization by USER B 507. FIG. 5e illustrates a flow diagram of USER operations at USER B 507 in establishing a collaborative session between USER A 505 and USER B 507, with both users sharing control and media and USER A 505 being configured for per-session authorization by USER B 507.

Figure 6A:
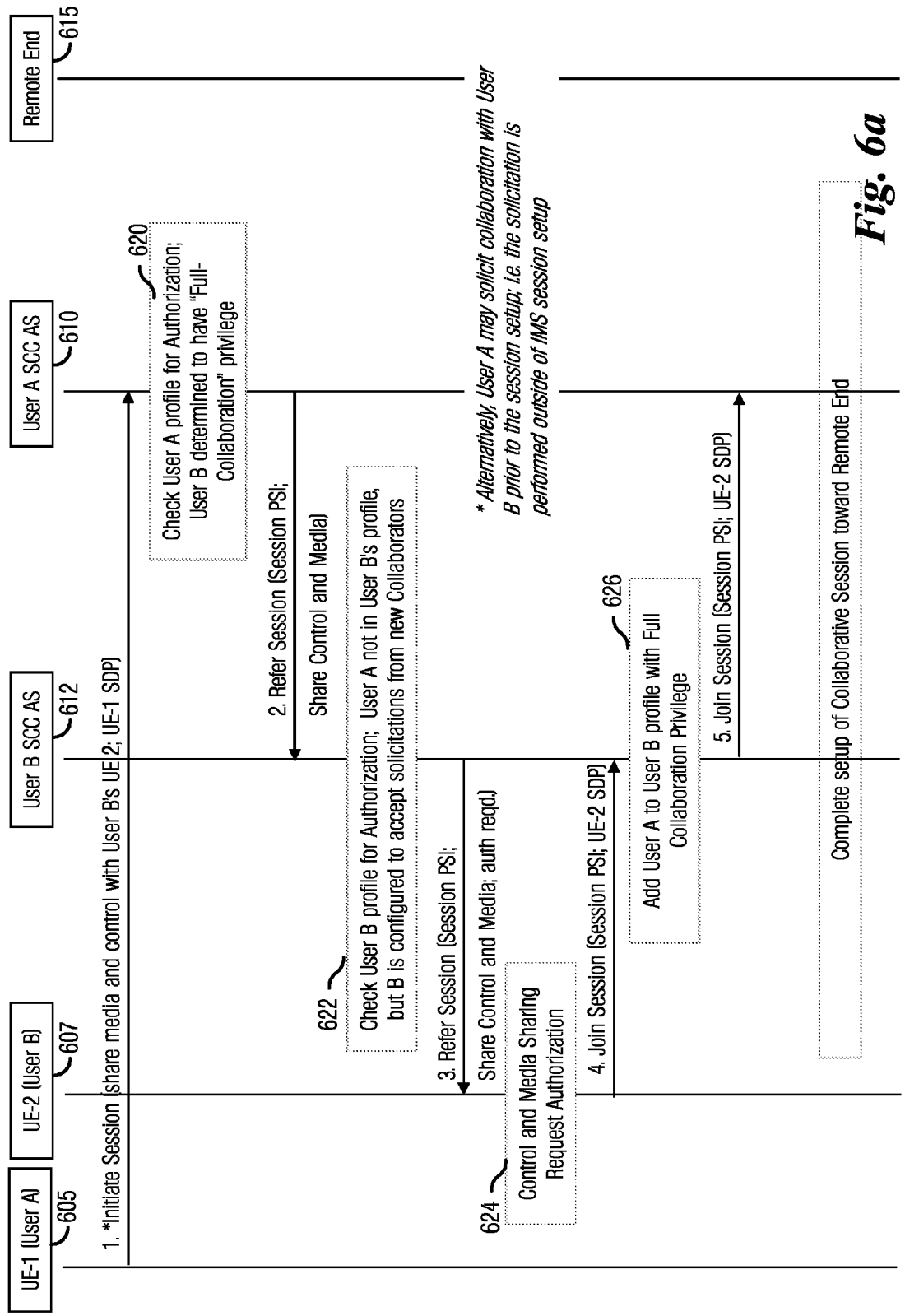
FIG. 6a is a diagram of a message exchange in establishing a collaborative session between a USER A and a USER B, with both users sharing control and media and USER A being configured for full collaboration privileges in a profile for USER B.

FIG. 6a illustrates a message exchange in establishing a collaborative session between a USER A and a USER B, with both users sharing control and media and USER A being configured for full collaboration privileges in a profile for USER B. USER B may be configured for full collaboration in a profile for USER A. As shown in FIG. 6a, the message exchange in establishing a collaborative session involves messages between USER A 605, USER B 607, a first SCC AS 610 serving USER A 605, a second SCC AS 612 serving USER B 607, and remote end users 615.

The message exchange may begin with USER A 605 initiating the collaborative session (shown as event #1). In the collaborative session USER A 605 intends to share media and control with USER B 607. USER A 605 may initiate the collaborative session by transmitting an INITIATE SESSION message or equivalent message to first SCC AS 610. According to an alternative embodiment, USER A 605 may solicit collaboration with USER B 607 prior to initiating the collaborative session, i.e., the solicitation may be performed outside of the setup of the collaborative session. First SCC AS 610 may check a profile of USER A 605 for authorization as well as to determine if USER B 607 has sufficient privilege to share media and control (block 620). According to an embodiment, USER B 607 may have sufficient privilege to share media and control if USER B 607 has full collaboration privilege. First SCC AS 610 may transmit a session refer message to second SCC AS 612 which is serving USER B 607 (shown as event #2). The session refer message may be in the form of a REFER SESSION message or equivalent message.

Second SCC AS 612 may check a profile of USER B 607 for authorization (block 622). For discussion purposes, let USER A 605 not be included in the profile of USER B 607, however USER B 607 may be configured to accept solicitations from new collaborators, USER A 605 in this instance.

Second SCC AS 612 may send a session refer message to USER B 607 (shown as event #3). The session refer message may be in the form of a REFER SESSION message or equivalent message. USER B 607 may perform a control and media sharing request authorization (block 624). Assuming that the control and media sharing request authorization succeeded, USER B 607 may respond to the session refer message with a join session message sent to second SCC AS 612 (shown as event #4). The join session message may be in the form of a JOIN SESSION message or equivalent message.

Second SCC AS 612, upon receipt of the join session message from USER B 607, may add USER A 605 to the profile of USER B 607 (block 626). According to an embodiment, USER A 605 may be added with full collaborator privileges. According to an alternative embodiment, if USER A 605 already exists in the profile of USER B 607, then instead of adding USER A 605, collaborative privileges of USER A 605 may be updated in the profile of USER B 607. Second SCC AS 612 may send a join session message of its own to first SCC AS 610 (shown as event #5). The join session message may be in the form of a JOIN SESSION message or equivalent message. USER A 605, USER B 607, first SCC AS 610, second SCC AS 612, and remote end users 615 may participate in further message exchanges to complete the setup of the collaborative session with remote end users 615.

FIG. 6b illustrates a flow diagram of USER operations at USER A 605 in establishing a collaborative session between USER A 605 and USER B 607, with both users sharing control and media and USER A 605 being configured for full collaboration privileges in a profile for USER B 607. FIG. 6c illustrates a flow diagram of SCC AS operations at first SCC AS 610 in establishing a collaborative session between USER A 605 and USER B 607, with both users sharing control and media and USER A 605 being configured for full collaboration privileges in a profile for USER B 607. FIG. 6d illustrates a flow diagram of SCC AS operations at second SCC AS 612 in establishing a collaborative session between USER A 605 and a USER B 607, with both users sharing control and media and USER A 605 being configured for full collaboration privileges in a profile for USER B 607. FIG. 6e illustrates a flow diagram of USER operations at USER B 607 in establishing a collaborative session between USER A 605 and USER B 607, with both users sharing control and media and USER A 605 being configured for full collaboration privileges in a profile for USER B 607.

Figure 7A:
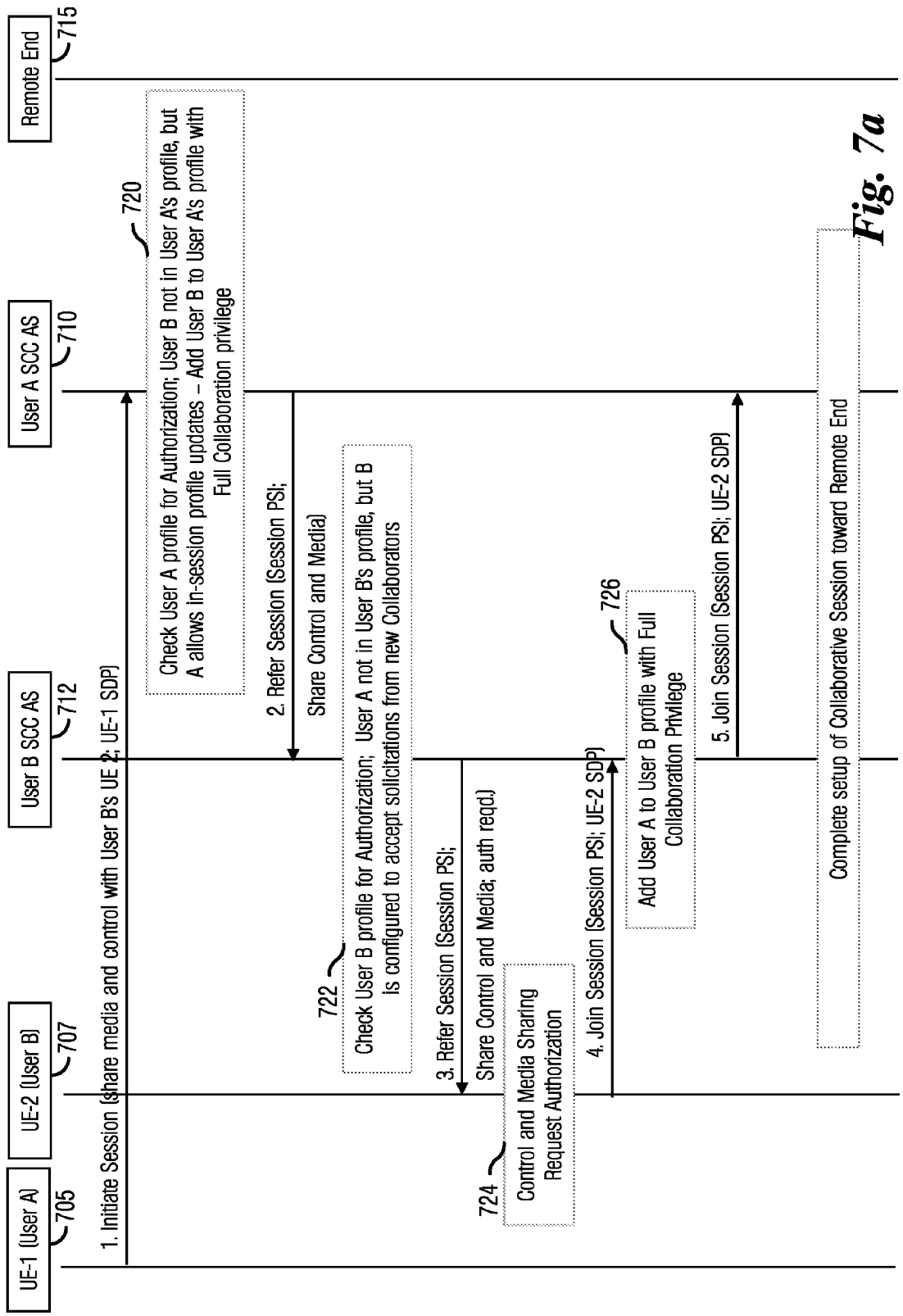
FIG. 7a is a diagram of a message exchange in establishing a collaborative session between a USER A and a USER B, with both users sharing control and media and USER A and USER B not being configured in each other's profiles.

FIG. 7a illustrates a message exchange in establishing a collaborative session between a USER A and a USER B, with both users sharing control and media and USER A and USER B not being configured in each other's profiles. However, USER A and USER B may be configured to accept in-session profile updates and new solicitations As shown in FIG. 7a, the message exchange in establishing a collaborative session involves messages between USER A 705, USER B 707, a first SCC AS 710 serving USER A 705, a second SCC AS 712 serving USER B 707, and remote end users 715.

The message exchange may begin with USER A 705 initiating the collaborative session (shown as event #1). In the collaborative session USER A 705 intends to share media and control with USER B 707. USER A 705 may initiate the collaborative session by transmitting an INITIATE SESSION message or equivalent message to first SCC AS 710. First SCC AS 710 may check a profile of USER A 705 for authorization (block 720). For discussion purposes, let USER B 707 not be in a profile for USER A 705, but USER A 705 allows in-session profile updates. Therefore, first SCC AS 710 may add USER B 707 to the profile for USER A 705. According to an embodiment, USER B 707 may be granted full collaboration privilege. First SCC AS 710 may transmit a session refer message to second SCC AS 712 which is serving USER B 707 (shown as event #2). The session refer message may be in the form of a REFER SESSION message or equivalent message.

Second SCC AS 712 may check a profile of USER B 707 for authorization (block 722). For discussion purposes, let USER A 705 not be included in the profile of USER B 707, however USER B 707 may be configured to accept solicitations from new collaborators, USER A 705 in this instance.

Second SCC AS 712 may send a session refer message to USER B 707 (shown as event #3). The session refer message may be in the form of a REFER SESSION message or equivalent message. USER B 707 may perform a control and media sharing request authorization (block 724). Assuming that the control and media sharing request authorization succeeded, USER B 707 may respond to the session refer message with a join session message sent to second SCC AS 712 (shown as event #4). The join session message may be in the form of a JOIN SESSION message or equivalent message.

Second SCC AS 712, upon receipt of the join session message from USER B 707, may add USER A 705 to the profile of USER B 707 (block 726). According to an embodiment, USER A 705 may be added with full collaborator privileges. According to an alternative embodiment, if USER A 705 already exists in the profile of USER B 707, then instead of adding USER A 705, collaborative privileges of USER A 705 may be updated in the profile of USER B 707. Second SCC AS 712 may send a join session message of its own to first SCC AS 710 (shown as event #5). The join session message may be in the form of a JOIN SESSION message or equivalent message. USER A 705, USER B 707, first SCC AS 710, second SCC AS 712, and remote end users 715 may participate in further message exchanges to complete the setup of the collaborative session with remote end users 715.

FIG. 7b illustrates a flow diagram of USER operations at USER A 705 in establishing a collaborative session between USER A 705 and USER B 707, with both users sharing control and media and USER A 705 and USER B 707 not being configured in each other's profiles. FIG. 7c illustrates a flow diagram of SCC AS operations at first SCC AS 710 in establishing a collaborative session between USER A 705 and USER B 707, with both users sharing control and media and USER A 705 and USER B 707 not being configured in each other's profiles. FIG. 7d illustrates a flow diagram of SCC AS operations at second SCC AS 712 in establishing a collaborative session between USER A 705 and a USER B 707, with both users sharing control and media and USER A 705 and USER B 707 not being configured in each other's profiles. FIG. 7e illustrates a flow diagram of USER operations at USER B 707 in establishing a collaborative session between USER A 705 and USER B 707, with both users sharing control and media and USER A 705 and USER B 707 not being configured in each other's profiles.

Figure 8A:
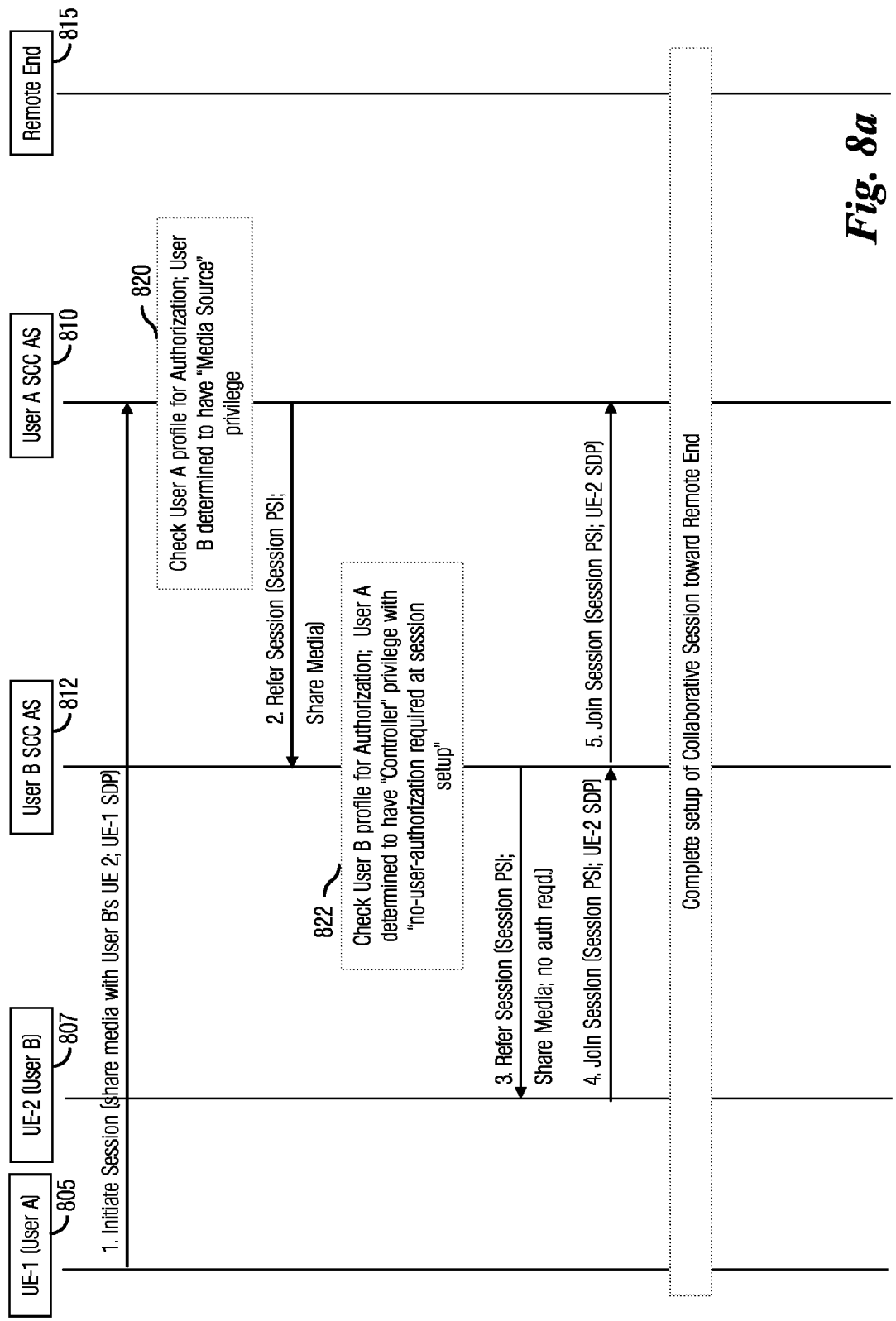
FIG. 8a is a diagram of a message exchange where USER A establishes a collaborative session using USER B's device for media, USER A being configured as a controller in a profile for USER B, and USER A provided default authorization by USER B.

FIG. 8a illustrates a message exchange where USER A establishes a collaborative session using USER B's device for media, USER A being configured as a controller in a profile for USER B, and USER A provided default authorization by USER B. Furthermore, USER B is configured as a media source in a profile for USER A. As shown in FIG. 8a, the message exchange in establishing a collaborative session involves messages between USER A 805, USER B 807, a first SCC AS 810 serving USER A 805, a second SCC AS 812 serving USER B 807, and remote end users 815.

The message exchange may begin with USER A 805 initiating the collaborative session (shown as event #1). In the collaborative session USER A 805 intends to use a device of USER B 807 as a media server. USER A 805 may initiate the collaborative session by transmitting an INITIATE SESSION message or equivalent message to first SCC AS 810. First SCC AS 810 may check a profile of USER A 805 for authorization and to determine if USER B 807 has media source privileges (block 820). First SCC AS 810 may transmit a session refer message to second SCC AS 812 which is serving USER B 807 (shown as event #2). The session refer message may be in the form of a REFER SESSION message or equivalent message.

Second SCC AS 812 may check a profile of USER B 807 for authorization (block 822). For discussion purposes, let USER A 805 have controller privileges in the profile of USER B 807, with "no-user-authorization required" at session setup.

Second SCC AS 812 may send a session refer message to USER B 807 (shown as event #3). The session refer message may be in the form of a REFER SESSION message or equivalent message. USER B 807 may respond to the session refer message with a join session message sent to second SCC AS 812 (shown as event #4). The join session message may be in the form of a JOIN SESSION message or equivalent message.

Second SCC AS 812, upon receipt of the join session message from USER B 807, may send a join session message of its own to first SCC AS 810 (shown as event #5). The join session message may be in the form of a JOIN SESSION message or equivalent message. USER A 805, USER B 807, first SCC AS 810, second SCC AS 812, and remote end users 815 may participate in further message exchanges to complete the setup of the collaborative session with remote end users 815.

FIG. 8*b* illustrates a flow diagram of USER operations at USER A 805 in establishing a collaborative session using USER B's device for media, USER A 805 being configured as a controller in a profile for USER B 807, and USER A 805 provided default authorization by USER B 807. FIG. 8*c* illustrates a flow diagram of SCC AS operations at first SCC AS 810 in establishing a collaborative session using USER B's device for media, USER A 805 being configured as a controller in a profile for USER B 807, and USER A 805 provided default authorization by USER B 807. FIG. 8*d* illustrates a flow diagram of SCC AS operations at second SCC AS 812 in establishing a collaborative session using USER B's device for media, USER A 805 being configured as a controller in a profile for USER B 807, and USER A 805 provided default authorization by USER B 807. FIG. 8*e* illustrates a flow diagram of USER operations at USER B 807 in establishing a collaborative session using USER B's device for media, USER A 805 being configured as a controller in a profile for USER B 807, and USER A 805 provided default authorization by USER B 807.

Figure 9A:
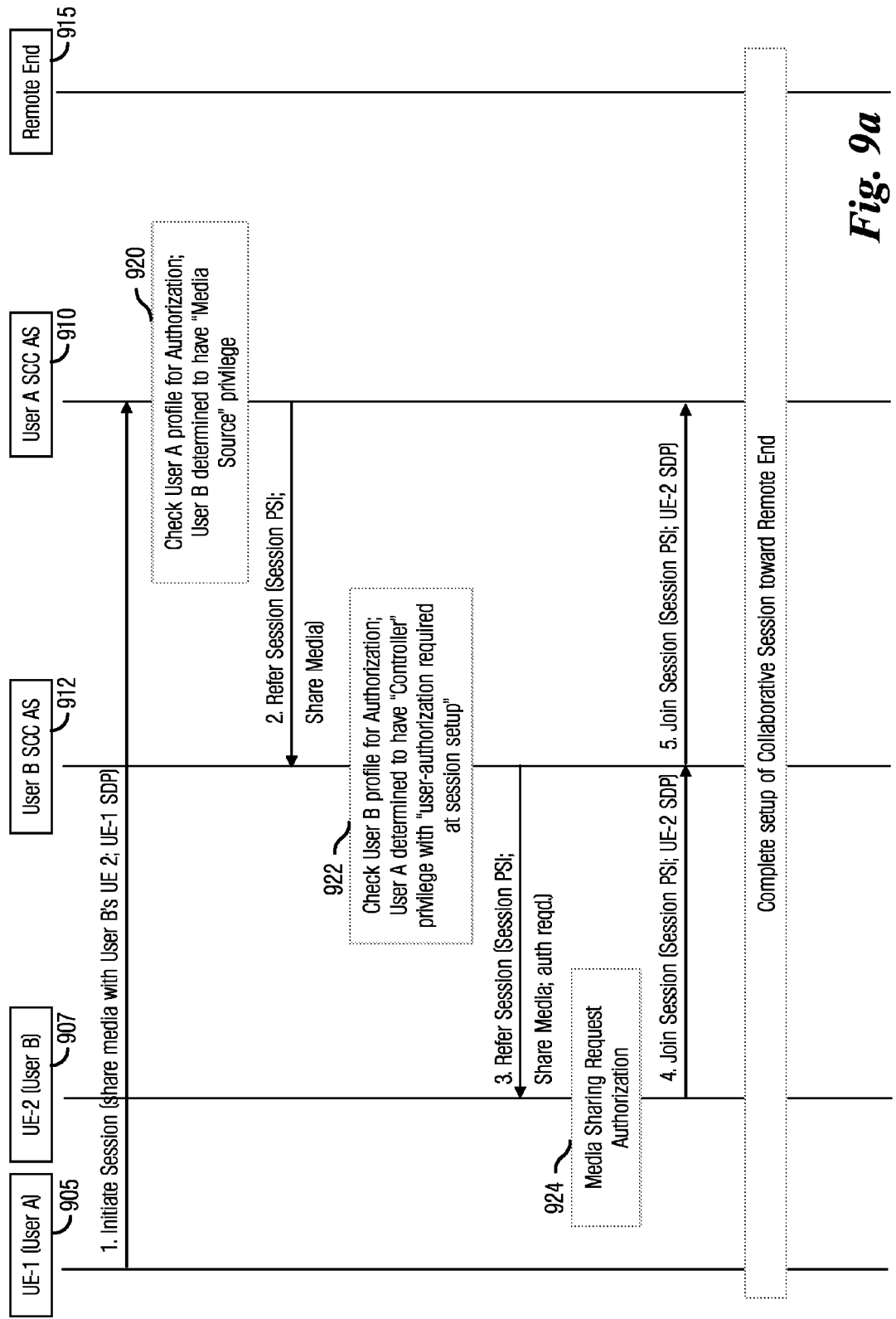
FIG. 9a is a diagram of a message exchange where USER A establishes a collaborative session using USER B's device for media, USER A being configured as a controller in a profile for USER B, and USER A being configured for per-session authorization by USER B.

FIG. 9*a* illustrates a message exchange where USER A establishes a collaborative session using USER B's device for media, USER A being configured as a controller in a profile for USER B, and USER A being configured for per-session authorization by USER B. Furthermore, USER B is configured as a media source in a profile for USER A. As shown in FIG. 9*a*, the message exchange in establishing a collaborative session involves messages between USER A 905, USER B 907, a first SCC AS 910 serving USER A 905, a second SCC AS 912 serving USER B 907, and remote end users 915.

The message exchange may begin with USER A 905 initiating the collaborative session (shown as event #1). In the collaborative session USER A 905 intends to use a device of USER B 907 as a media server. USER A 905 may initiate the collaborative session by transmitting an INITIATE SESSION message or equivalent message to first SCC AS 910. First SCC AS 910 may check a profile of USER A 905 for authorization and to determine if USER B 907 has media source privileges (block 920). If USER A 905 is authorized and if USER B 907 has media source privileges, first SCC AS 910 may transmit a session refer message to second SCC AS 912 which is serving USER B 907 (shown as event #2). The session refer message may be in the form of a REFER SESSION message or equivalent message.

Second SCC AS 912 may check a profile of USER B 907 for authorization (block 922). For discussion purposes, let USER A 905 have controller privileges in the profile of USER B 907, with "user-authorization required" at session setup.

Second SCC AS 912 may send a session refer message to USER B 907 (shown as event #3). The session refer message may be in the form of a REFER SESSION message or equivalent message. USER B 907 may perform a media sharing request authorization (block 924). USER B 907 may respond to the session refer message with a join session message sent to second SCC AS 912 (shown as event #4). The join session message may be in the form of a JOIN SESSION message or equivalent message.

Second SCC AS 912, upon receipt of the join session message from USER B 907, may send a join session message of its own to first SCC AS 910 (shown as event #5). The join session message may be in the form of a JOIN SESSION message or equivalent message. USER A 905, USER B 907, first SCC AS 910, second SCC AS 912, and remote end users 915 may participate in further message exchanges to complete the setup of the collaborative session with remote end users 915.

Figure 9E:
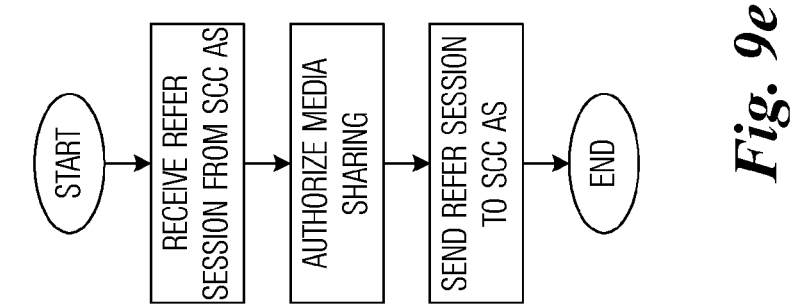
FIG. 9e is a flow diagram of USER operations at USER B in establishing a collaborative session using USER B's device for media, USER A being configured as a controller in a profile for USER B, and USER A being configured for per-session authorization by USER B.
Figure 9D:
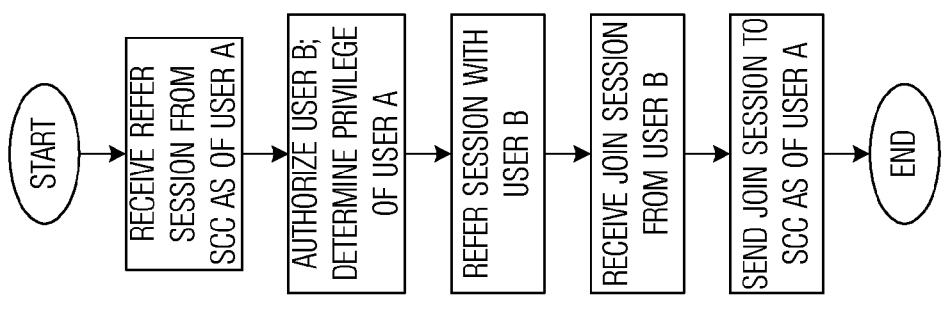
FIG. 9d is a flow diagram of SCC AS operations at second SCC AS in establishing a collaborative session using USER B's device for media, USER A being configured as a controller in a profile for USER B, and USER A being configured for per-session authorization by USER B.
Figure 9C:
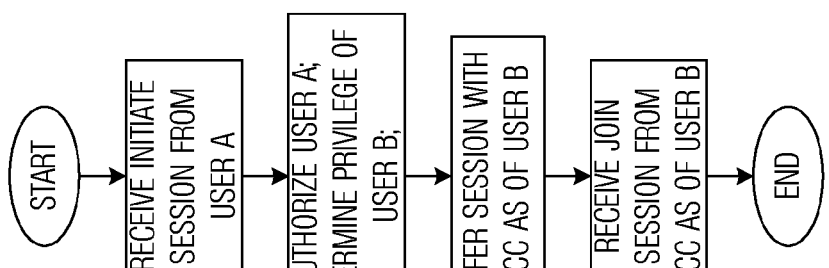
FIG. 9c is a flow diagram of SCC AS operations at first SCC AS in establishing a collaborative session using USER B's device for media, USER A being configured as a controller in a profile for USER B, and USER A being configured for per-session authorization by USER B.
Figure 9B:
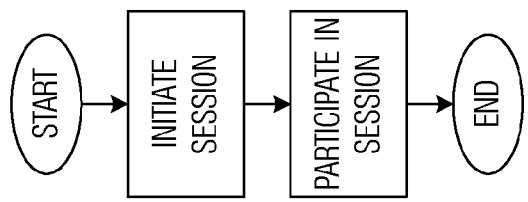
FIG. 9b is a flow diagram of USER operations at USER A in establishing a collaborative session using USER B's device for media, USER A being configured as a controller in a profile for USER B, and USER A being configured for per-session authorization by USER B.

FIG. 9*b* illustrates a flow diagram of USER operations at USER A 905 in establishing a collaborative session using USER B's device for media, USER A 905 being configured as a controller in a profile for USER B 907, and USER A 905 being configured for per-session authorization by USER B 907. FIG. 9*c* illustrates a flow diagram of SCC AS operations at first SCC AS 910 in establishing a collaborative session using USER B's device for media, USER A 905 being configured as a controller in a profile for USER B 907, and USER A 905 being configured for per-session authorization by USER B 907. FIG. 9*d* illustrates a flow diagram of SCC AS operations at second SCC AS 912 in establishing a collaborative session using USER B's device for media, USER A 905 being configured as a controller in a profile for USER B 907, and USER A 905 being configured for per-session authorization by USER B 907. FIG. 9*e* illustrates a flow diagram of USER operations at USER B 907 in establishing a collaborative session using USER B's device for media, USER A 905 being configured as a controller in a profile for USER B 907, and USER A 905 being configured for per-session authorization by USER B 907.

Figure 10A:
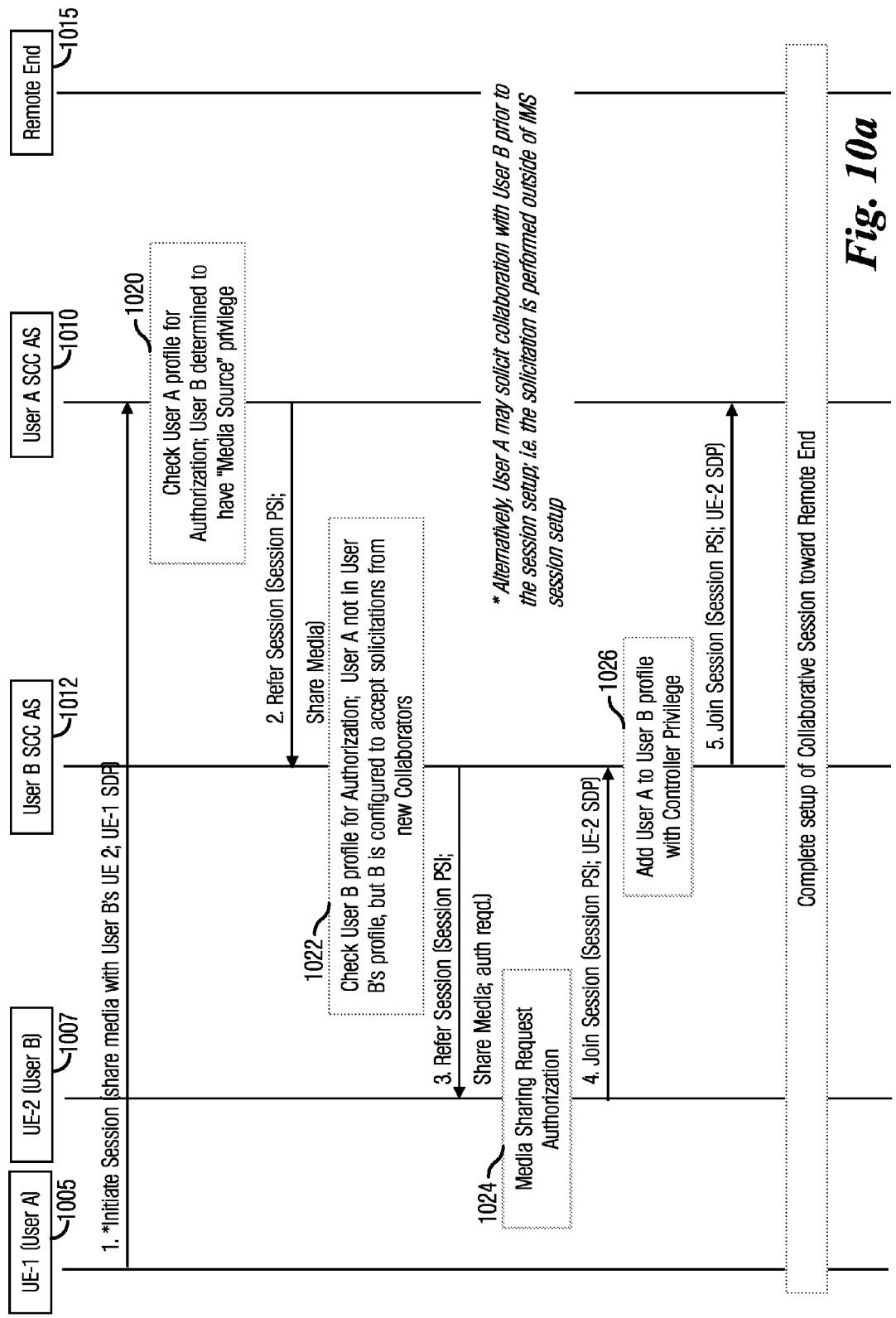
FIG. 10a is a diagram of a message exchange where USER A establishes a collaborative session using USER B's device for media and USER B being configured to accept solicitations from new collaborators.

FIG. 10*a* illustrates a message exchange where USER A establishes a collaborative session using USER B's device for media and USER B being configured to accept solicitations from new collaborators. Furthermore, USER B is configured as a media source in a profile for USER A. As shown in FIG. 10*a*, the message exchange in establishing a collaborative session involves messages between USER A 1005, USER B 1007, a first SCC AS 1010 serving USER A 1005, a second SCC AS 1012 serving USER B 1007, and remote end users 1015.

The message exchange may begin with USER A 1005 initiating the collaborative session (shown as event #1). In the collaborative session USER A 1005 intends to use a device of USER B 1007 as a media server. USER A 1005 may initiate the collaborative session by transmitting an INITIATE SESSION message or equivalent message to first SCC AS 1010. First SCC AS 1010 may check a profile of USER A 1005 for authorization and to determine if USER B 1007 has media source privileges (block 1020). If USER A 1005 is authorized and if USER B 1007 has media source privileges, first SCC AS 1010 may transmit a session refer message to second SCC AS 1012 which is serving USER B 1007 (shown as event #2). The session refer message may be in the form of a REFER SESSION message or equivalent message.

Second SCC AS 1012 may check a profile of USER B 1007 for authorization (block 1022). For discussion purposes, let USER A 1005 not be present in the profile of USER B 1007. However, USER B 1007 may be configured to accept solicitations from new collaborators.

Second SCC AS 1012 may send a session refer message to USER B 1007 (shown as event #3). The session refer message may be in the form of a REFER SESSION message or equivalent message. USER B 1007 may perform a media sharing request authorization (block 1024). USER B 1007 may respond to the session refer message with a join session message sent to second SCC AS 1012 (shown as event #4). The join session message may be in the form of a JOIN SESSION message or equivalent message.

Second SCC AS 1012, upon receipt of the join session message from USER B 907, may add USER A 1005 to the profile of USER B 1007 with USER A 1005 being added with controller privileges (block 1026). According to an embodiment, if USER A 1005 already exists in the profile of USER B 1007, then instead of adding USER A 1005, collaborative privileges of USER A 1005 may be updated in the profile of USER B 1007. Second SCC AS 1012 may send a join session message of its own to first SCC AS 1010 (shown as event #5). The join session message may be in the form of a JOIN SESSION message or equivalent message. USER A 1005, USER B 1007, first SCC AS 1010, second SCC AS 1012, and remote end users 1015 may participate in further message exchanges to complete the setup of the collaborative session with remote end users 1015.

FIG. 10*b* illustrates a flow diagram of USER operations at USER A 1005 in establishing a collaborative session using USER B's device for media, USER B 1007 being configured to accept solicitations from new collaborators, and USER B 1007 being configured as a media source in the profile of USER A 1005. FIG. 10*c* illustrates a flow diagram of SCC AS operations at first SCC AS 1010 in establishing a collaborative session using USER B's device for media, USER B 1007 being configured to accept solicitations from new collaborators, and USER B 1007 being configured as a media source in the profile of USER A 1005. FIG. 10*d* illustrates a flow diagram of SCC AS operations at second SCC AS 1012 in establishing a collaborative session using USER B's device for media, USER B 1007 being configured to accept solicitations from new collaborators, and USER B 1007 being configured as a media source in the profile of USER A 1005. FIG. 10*e* illustrates a flow diagram of USER operations at USER B 1007 in establishing a collaborative session using USER B's device for media, USER B 1007 being configured to accept solicitations from new collaborators, and USER B 1007 being configured as a media source in the profile of USER A 1005.

Figure 11A:
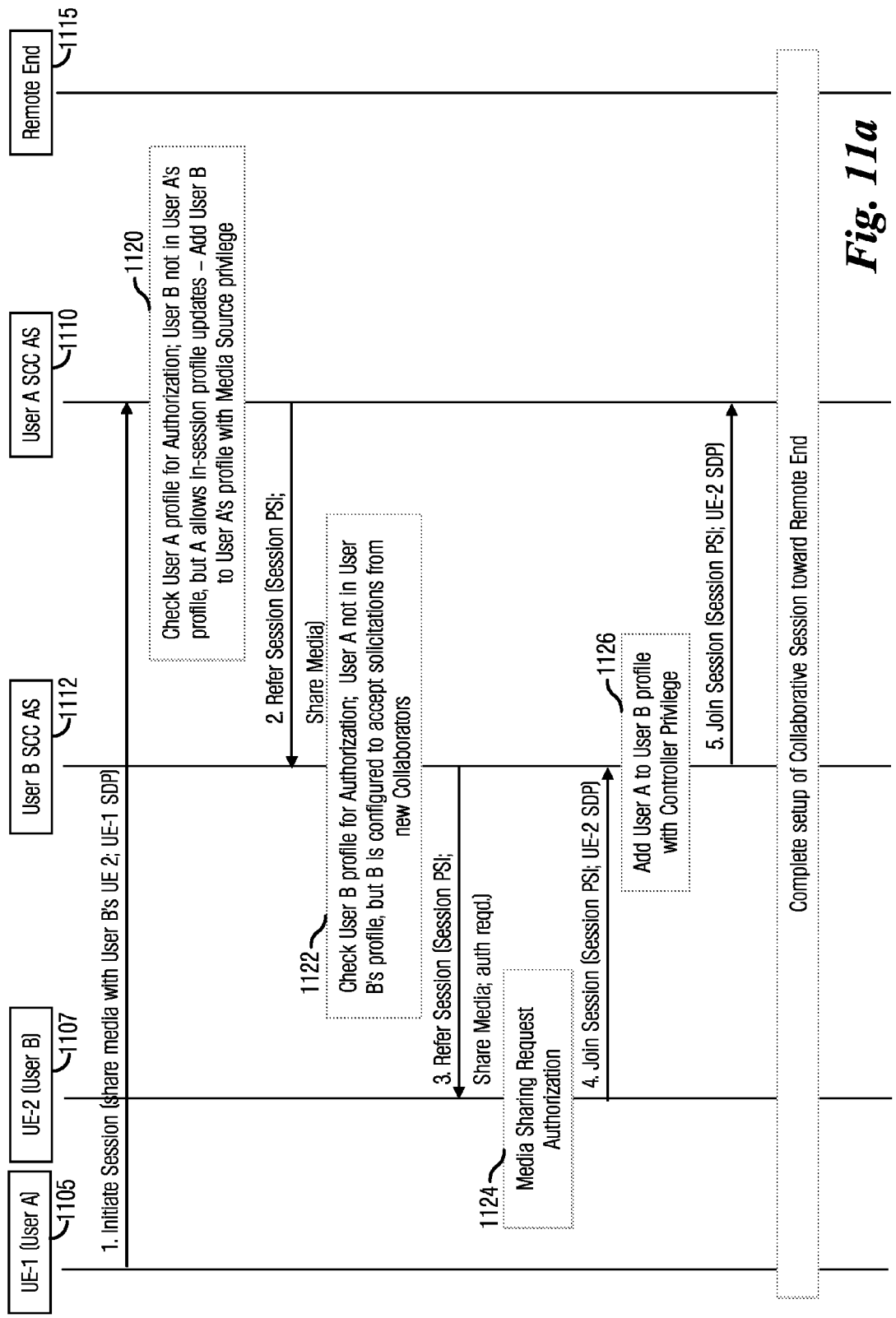
FIG. 11a is a diagram of a message exchange where USER A establishes a collaborative session using USER B's device for media and USER A and USER B not being configured in each other's profiles.

FIG. 11*a* illustrates a message exchange where USER A establishes a collaborative session using USER B's device for media and USER A and USER B not being configured in each other's profiles. However, USER A and USER B may be configured to accept in-session profile updates and new solicitations. As shown in FIG. 11*a*, the message exchange in establishing a collaborative session involves messages between USER A 1105, USER B 1107, a first SCC AS 1110 serving USER A 1105, a second SCC AS 1112 serving USER B 1107, and remote end users 1115.

The message exchange may begin with USER A 1105 initiating the collaborative session (shown as event #1). In the collaborative session USER A 1105 intends to use a device of USER B 1107 as a media server. USER A 1105 may initiate the collaborative session by transmitting an INITIATE SESSION message or equivalent message to first SCC AS 1110. First SCC AS 1110 may check a profile of USER A 1105 for authorization (block 1120). While checking the profile of USER A 1105, first SCC AS 1110 determines that USER B 1107 is not in the profile of USER A 1105. However, USER A 1105 allows in-session profile updates as well as new solicitations. First SCC AS 1110 may add USER B 1107 to the profile for USER A 1105 (block 1120). First SCC AS 1110 may transmit a session refer message to second SCC AS 1112 which is serving USER B 1107 (shown as event #2). The session refer message may be in the form of a REFER SESSION message or equivalent message.

Second SCC AS 1112 may check a profile of USER B 1107 for authorization (block 1122). For discussion purposes, let USER A 1105 not be present in the profile of USER B 1107. However, USER B 1107 may be configured to accept solicitations from new collaborators.

Second SCC AS 1112 may send a session refer message to USER B 1107 (shown as event #3). The session refer message may be in the form of a REFER SESSION message or equivalent message. USER B 1107 may perform a media sharing request authorization (block 1124). Let the media sharing request authorization succeed, USER B 1107 may respond to the session refer message with a join session message sent to second SCC AS 1112 (shown as event #4). The join session message may be in the form of a JOIN SESSION message or equivalent message.

Second SCC AS 1112, upon receipt of the join session message from USER B 907, may add USER A 1105 to the profile of USER B 1107 with USER A 1105 being added with controller privileges (block 1126). According to an embodiment, if USER A 1105 already exists in the profile of USER B 1107, then instead of adding USER A 1105, collaborative privileges of USER A 1105 may be updated in the profile of USER B 1107. Second SCC AS 1112 may send a join session message of its own to first SCC AS 1110 (shown as event #5). The join session message may be in the form of a JOIN SESSION message or equivalent message. USER A 1105, USER B 1107, first SCC AS 1110, second SCC AS 1112, and remote end users 1115 may participate in further message exchanges to complete the setup of the collaborative session with remote end users 1115.

Figure 11E:
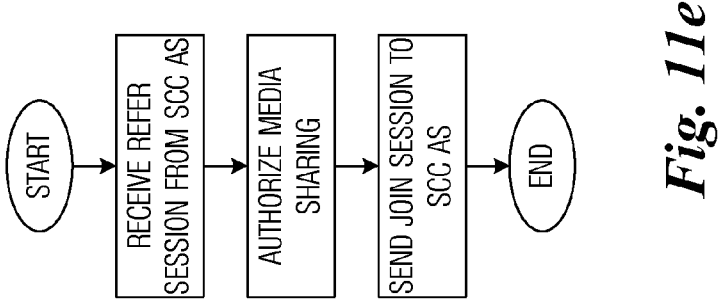
FIG. 11e is a flow diagram of USER operations at USER B in establishing a collaborative session using USER B's device for media, USER A and USER B not being configured in each other's profiles but may accept in-session profile updates and new solicitations.
Figure 11D:
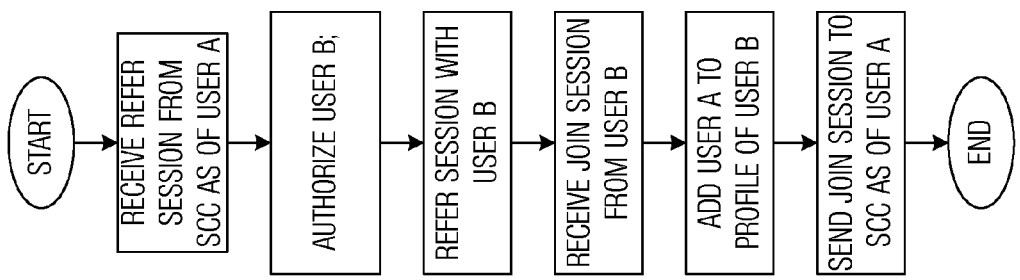
FIG. 11d is a flow diagram of SCC AS operations at second SCC AS in establishing a collaborative session using USER B's device for media, USER A and USER B not being configured in each other's profiles but may accept in-session profile updates and new solicitations.
Figure 11C:
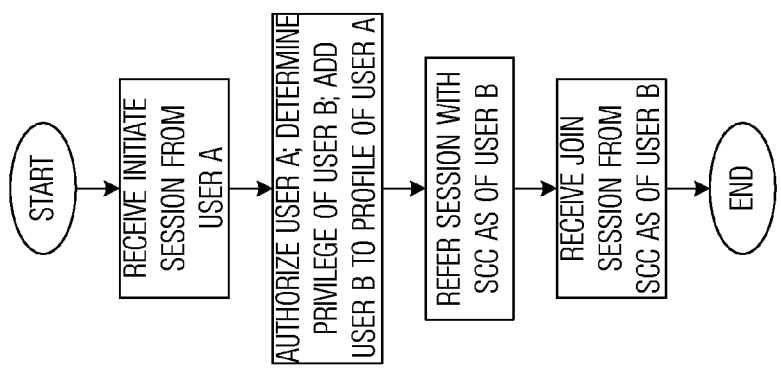
FIG. 11c is a flow diagram of SCC AS operations at first SCC AS in establishing a collaborative session using USER B's device for media, USER A and USER B not being configured in each other's profiles but may accept in-session profile updates and new solicitations.
Figure 11B:
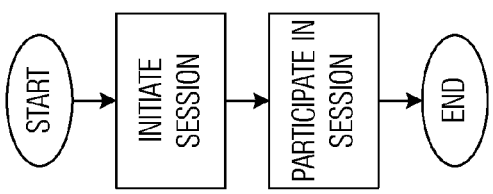
FIG. 11b is a flow diagram of USER operations at USER A in establishing a collaborative session using USER B's device for media, USER A and USER B not being configured in each other's profiles but may accept in-session profile updates and new solicitations.

FIG. 11*b* illustrates a flow diagram of USER operations at USER A 1105 in establishing a collaborative session using USER B's device for media, USER A 1105 and USER B 1107 not being configured in each other's profiles but may accept in-session profile updates and new solicitations. FIG. 11*c* illustrates a flow diagram of SCC AS operations at first SCC AS 1110 in establishing a collaborative session using USER B's device for media, USER A 1105 and USER B 1107 not being configured in each other's profiles but may accept in-session profile updates and new solicitations. FIG. 11*d* illustrates a flow diagram of SCC AS operations at second SCC AS 1112 in establishing a collaborative session using USER B's device for media, USER A 1105 and USER B 1107 not being configured in each other's profiles but may accept in-session profile updates and new solicitations. FIG. 11e illustrates a flow diagram of USER operations at USER B 1107 in establishing a collaborative session using USER B's device for media, USER A 1105 and USER B 1107 not being configured in each other's profiles but may accept in-session profile updates and new solicitations.

Figure 12A:
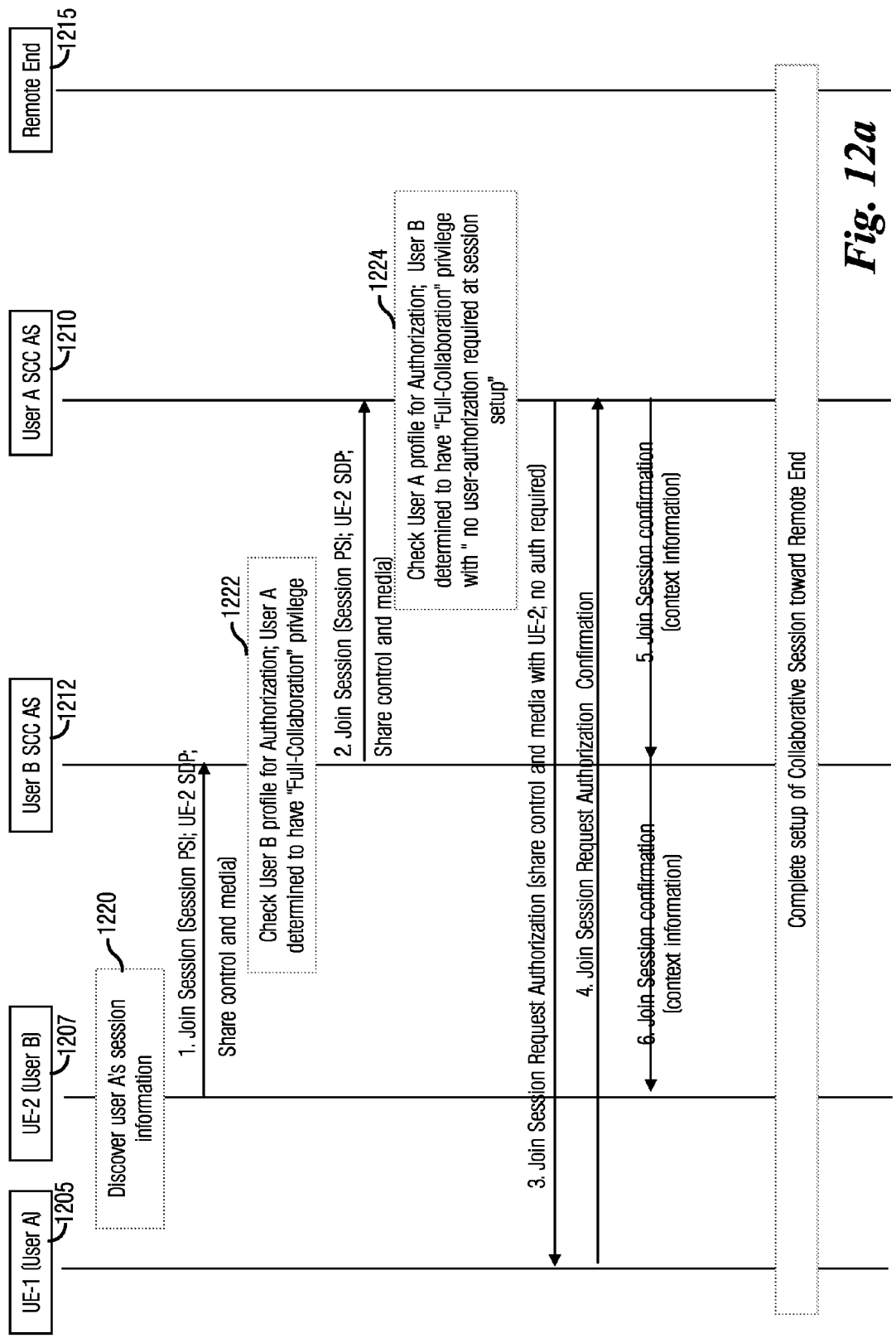
FIG. 12a is a diagram of a message exchange where USER B adds itself to an ongoing collaborative session with USER A for sharing control and media and USER A provided default authorization by USER B.

FIG. 12a illustrates a message exchange where USER B adds itself to an ongoing collaborative session with USER A for sharing control and media and USER A provided default authorization by USER B. Both USER A and USER B may be configured for full collaboration privileges in each others profiles. As shown in FIG. 12a, the message exchange in establishing a collaborative session involves messages between USER A 1205, USER B 1207, a first SCC AS 1210 serving USER A 1205, a second SCC AS 1212 serving USER B 1207, and remote end users 1215.

The message exchange may begin with USER B 1207 discovering information related to the collaborative session involving USER A 1205 (block 1220). USER B 1207 may attempt to add itself to the collaborative session by transmitting a JOIN SESSION message to second SCC AS 1212, serving USER B 1207 (shown as event #1). Second SCC AS 1212 may check a profile of USER B 1207 for authorization as well as determining if USER A 1205 has full collaboration privileges (block 1222).

For discussion purposes, assume that USER B 1207 is authorized and that USER A 1205 has full collaboration privileges. Second SCC AS 1212 may send a join session message to first SCC AS 1210 which is serving USER A 1205 (shown as event #2). The join session message may be in the form of a JOIN SESSION message or equivalent message.

First SCC AS 1210 may check a profile of USER A 1205 for authorization and determining if USER B 1207 has full collaboration privileges along with "no-user-authorization required" at session setup setting (block 1224). For discussion purposes let USER B 1207 have full collaboration privileges with "no-user-authorization required" at session setup setting, first SCC AS 1210 may transmit a join session request authorization message to USER A 1205 (shown as event #3). The join session request authorization message may be in the form of a JOIN SESSION REQUEST AUTHORIZATION message or equivalent message.

USER A 1205 may allow USER B 1207 to join in the collaborative session and may respond with a join session request authorization confirmation message to first SCC AS 1210 (shown as event #4). The join session request authorization confirmation message may be in the form of a JOIN SESSION REQUEST AUTHORIZATION CONFIRMATION message or equivalent message.

First SCC AS 1210 may send a join session confirmation message (in the form of a JOIN SESSION CONFIRMATION message or equivalent message) to second SCC AS 1212 (shown as event #5) and second SCC AS 1212 may sent a join session confirmation message (e.g., a JOIN SESSION CONFIRMATION message or equivalent message) to USER B 1207 (shown as event #6). USER A 1205, USER B 1207, first SCC AS 1210, second SCC AS 1212, and remote end users 1215 may participate in further message exchanges to complete the setup of the collaborative session with remote end users 1215.

FIG. 12b illustrates a flow diagram of USER operations at USER B 1207 in joining an ongoing collaborative session with USER A 1205, with USER A 1205 provided default authorization by USER B 1207 and both USER A 1205 and USER B 1207 may be configured for full collaboration privileges in each others profiles. FIG. 12c illustrates a flow diagram of SCC AS operations at second SCC AS 1212 in joining an ongoing collaborative session with USER A 1205, with USER A 1205 provided default authorization by USER B 1207 and both USER A 1205 and USER B 1207 may be configured for full collaboration privileges in each others profiles. FIG. 12d illustrates a flow diagram of SCC AS operations at first SCC AS 1210 in joining an ongoing collaborative session with USER A 1205, with USER A 1205 provided default authorization by USER B 1207 and both USER A 1205 and USER B 1207 may be configured for full collaboration privileges in each others profiles. FIG. 12e illustrates a flow diagram of USER operations at USER A 1205 in joining an ongoing collaborative session with USER A 1205, with USER A 1205 provided default authorization by USER B 1207 and both USER A 1205 and USER B 1207 may be configured for full collaboration privileges in each others profiles.

Figure 13A:
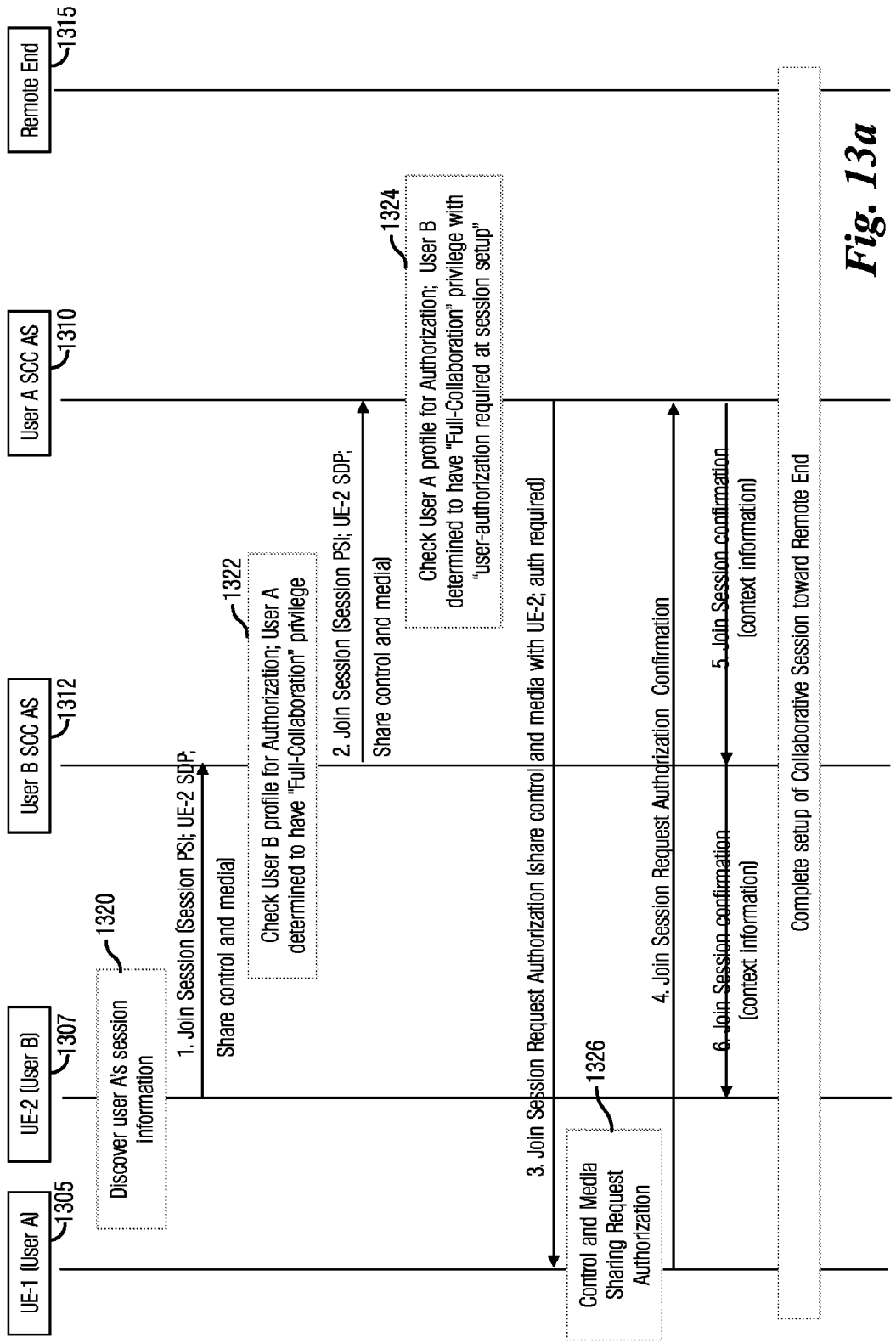
FIG. 13a is a diagram of a message exchange where USER B adds itself to an ongoing collaborative session with USER A for sharing control and media and USER A being configured for per-session authorization by USER B.

FIG. 13a illustrates a message exchange where USER B adds itself to an ongoing collaborative session with USER A for sharing control and media and USER A being configured for per-session authorization by USER B. Both USER A and USER B may be configured for full collaboration privileges in each others profiles. As shown in FIG. 13a, the message exchange in establishing a collaborative session involves messages between USER A 1305, USER B 1307, a first SCC AS 1310 serving USER A 1305, a second SCC AS 1312 serving USER B 1307, and remote end users 1315.

The message exchange may begin with USER B 1307 discovering information related to the collaborative session involving USER A 1305 (block 1320). USER B 1307 may attempt to add itself to the collaborative session by transmitting a JOIN SESSION message to second SCC AS 1312, serving USER B 1307 (shown as event #1). Second SCC AS 1312 may check a profile of USER B 1307 for authorization as well as determining if USER A 1305 has full collaboration privileges (block 1322).

For discussion purposes, assume that USER B 1307 is authorized and that USER A 1305 has full collaboration privileges. Second SCC AS 1312 may send a join session message to first SCC AS 1310 which is serving USER A 1305 (shown as event #2). The join session message may be in the form of a JOIN SESSION message or equivalent message.

First SCC AS 1310 may check a profile of USER A 1305 for authorization and to determining if USER B 1307 has full collaboration privileges along with "user-authorization required" at session setup setting (block 1324). For discussion purposes let USER B 1307 have full collaboration privileges with "user-authorization required" at session setup setting, first SCC AS 1310 may transmit a join session request authorization message to USER A 1305 (shown as event #3). The join session request authorization message may be in the form of a JOIN SESSION REQUEST AUTHORIZATION message or equivalent message.

USER A 1305 may perform a control and media sharing request authorization (block 1326). Assume that the control and media request authorization succeeded, USER A 1305 may allow USER B 1307 to join in the collaborative session and may respond with a join session request authorization confirmation message to first SCC AS 1310 (shown as event #4). The join session request authorization confirmation message may be in the form of a JOIN SESSION REQUEST AUTHORIZATION CONFIRMATION message or equivalent message.

First SCC AS 1310 may send a join session confirmation message (in the form of a JOIN SESSION CONFIRMATION message or equivalent message) to second SCC AS 1312

(shown as event #5) and second SCC AS 1312 may sent a join session confirmation message (e.g., a JOIN SESSION CONFIRMATION message or equivalent message) to USER B 1307 (shown as event #6). USER A 1305, USER B 1307, first SCC AS 1310, second SCC AS 1312, and remote end users 1315 may participate in further message exchanges to complete the setup of the collaborative session with remote end users 1315.

FIG. 13b illustrates a flow diagram of USER operations at USER B 1307 in joining an ongoing collaborative session with USER A 1305, with USER A 1305 being configured for per-session authorization by USER B 1307 and both USER A 1305 and USER B 1307 may be configured for full collaboration privileges in each others profiles. FIG. 13c illustrates a flow diagram of SCC AS operations at second SCC AS 1312 in joining an ongoing collaborative session with USER A 1305, with USER A 1305 being configured for per-session authorization by USER B 1307 and both USER A 1305 and USER B 1307 may be configured for full collaboration privileges in each others profiles. FIG. 13d illustrates a flow diagram of SCC AS operations at first SCC AS 1310 in joining an ongoing collaborative session with USER A 1305, with USER A 1305 being configured for per-session authorization by USER B 1307 and both USER A 1305 and USER B 1307 may be configured for full collaboration privileges in each others profiles. FIG. 13e illustrates a flow diagram of USER operations at USER A 1305 in joining an ongoing collaborative session with USER A 1305, with USER A 1305 being configured for per-session authorization by USER B 1307 and both USER A 1305 and USER B 1307 may be configured for full collaboration privileges in each others profiles.

Figure 14A:
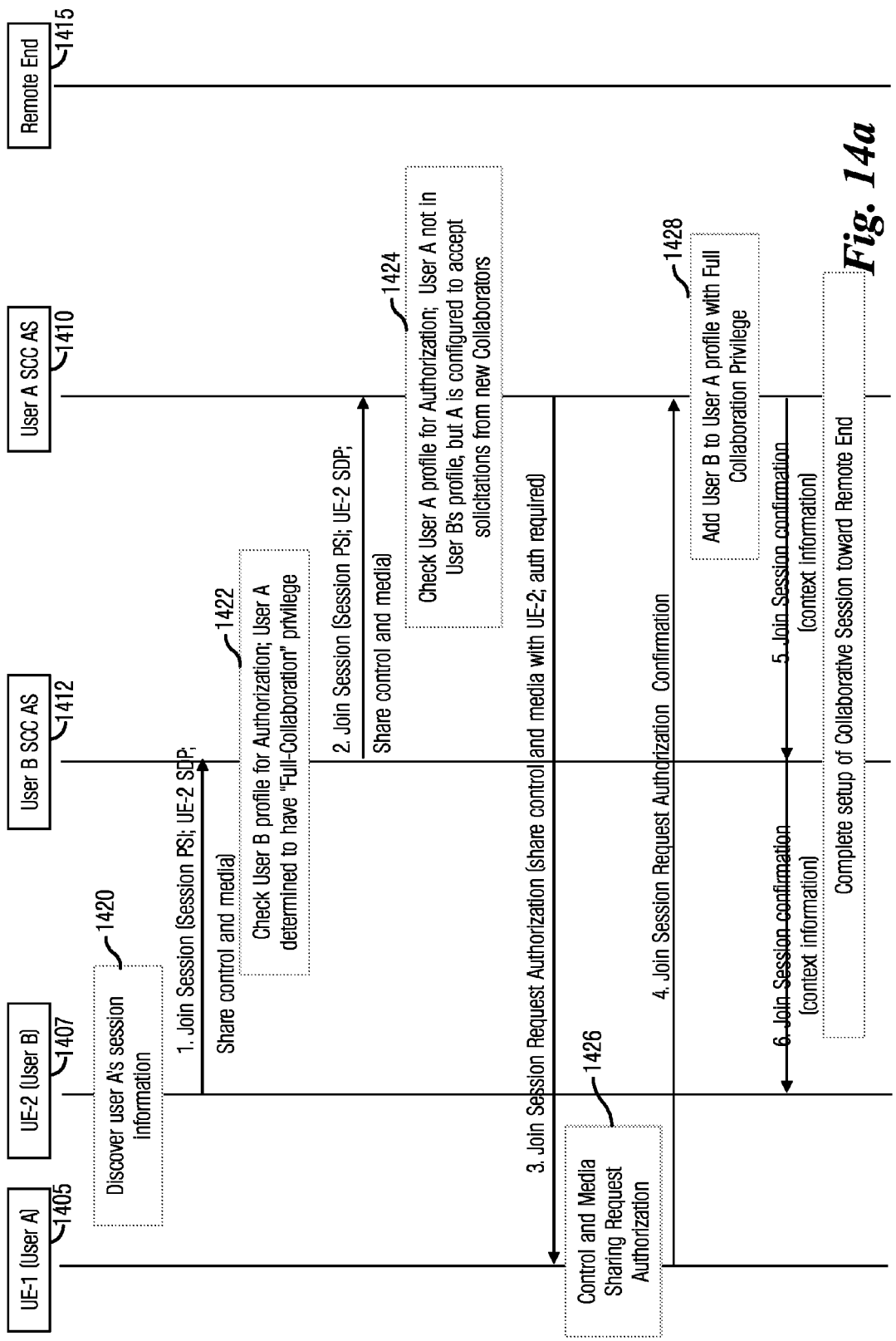
FIG. 14a is a diagram of a message exchange where USER B adds itself to an ongoing collaborative session with USER A for sharing control and media and USER A being configured to accept new solicitations.

FIG. 14a illustrates a message exchange where USER B adds itself to an ongoing collaborative session with USER A for sharing control and media and USER A being configured to accept new solicitations. USER A may be configured for full collaboration privileges in a profile of USER B. As shown in FIG. 14a, the message exchange in establishing a collaborative session involves messages between USER A 1405, USER B 1407, a first SCC AS 1410 serving USER A 1405, a second SCC AS 1412 serving USER B 1407, and remote end users 1415.

The message exchange may begin with USER B 1407 discovering information related to the collaborative session involving USER A 1405 (block 1420). USER B 1407 may attempt to add itself to the collaborative session by transmitting a JOIN SESSION message to second SCC AS 1412, serving USER B 1407 (shown as event #1). Second SCC AS 1412 may check a profile of USER B 1407 for authorization as well as determining if USER A 1405 has full collaboration privileges (block 1422).

For discussion purposes, assume that USER B 1407 is authorized and that USER A 1405 has full collaboration privileges. Second SCC AS 1412 may send a join session message to first SCC AS 1410 which is serving USER A 1405 (shown as event #2). The join session message may be in the form of a JOIN SESSION message or equivalent message.

First SCC AS 1410 may check a profile of USER A 1405 for authorization (block 1424). However, USER A 1405 is not in the profile of USER B 1407 but USER A 1405 may be configured to accept solicitations from new collaborators. First SCC AS 1410 may transmit a join session request authorization message to USER A 1405 (shown as event #3). The join session request authorization message may be in the form of a JOIN SESSION REQUEST AUTHORIZATION message or equivalent message.

USER A 1405 may perform a control and media sharing request authorization (block 1426). Assume that the control and media request authorization succeeded, USER A 1405 may allow USER B 1407 to join in the collaborative session and may respond with a join session request authorization confirmation message to first SCC AS 1410 (shown as event #4). The join session request authorization confirmation message may be in the form of a JOIN SESSION REQUEST AUTHORIZATION CONFIRMATION message or equivalent message.

First SCC AS 1410 may add USER B 1407 to the profile of USER A 1405 with full collaboration privileges (block 1428). According to an alternative embodiment, if USER B 1407 already exists in the profile of USER A 1405, then instead of adding USER B 1407, collaborative privileges of USER B 1407 may be updated in the profile of USER A 1405. First SCC AS 1410 may send a join session confirmation message (in the form of a JOIN SESSION CONFIRMATION message or equivalent message) to second SCC AS 1412 (shown as event #5) and second SCC AS 1412 may sent a join session confirmation message (e.g., a JOIN SESSION CONFIRMATION message or equivalent message) to USER B 1407 (shown as event #6). USER A 1405, USER B 1407, first SCC AS 1410, second SCC AS 1412, and remote end users 1415 may participate in further message exchanges to complete the setup of the collaborative session with remote end users 1415.

FIG. 14b illustrates a flow diagram of USER operations at USER B 1407 in joining an ongoing collaborative session with USER A 1405, with USER A 1405 being configured for accepting new solicitations and USER A 1405 may be configured for full collaboration privileges in the profile of USER B 1407. FIG. 14c illustrates a flow diagram of SCC AS operations at second SCC AS 1412 in joining an ongoing collaborative session with USER A 1405, with USER A 1405 being configured for accepting new solicitations and USER A 1405 may be configured for full collaboration privileges in the profile of USER B 1407. FIG. 14d illustrates a flow diagram of SCC AS operations at first SCC AS 1410 in joining an ongoing collaborative session with USER A 1405, with USER A 1405 being configured for accepting new solicitations and USER A 1405 may be configured for full collaboration privileges in the profile of USER B 1407. FIG. 14e illustrates a flow diagram of USER operations at USER A 1405 in joining an ongoing collaborative session with USER A 1405, with USER A 1405 being configured for accepting new solicitations and USER A 1405 may be configured for full collaboration privileges in the profile of USER B 1407.

Figure 15A:
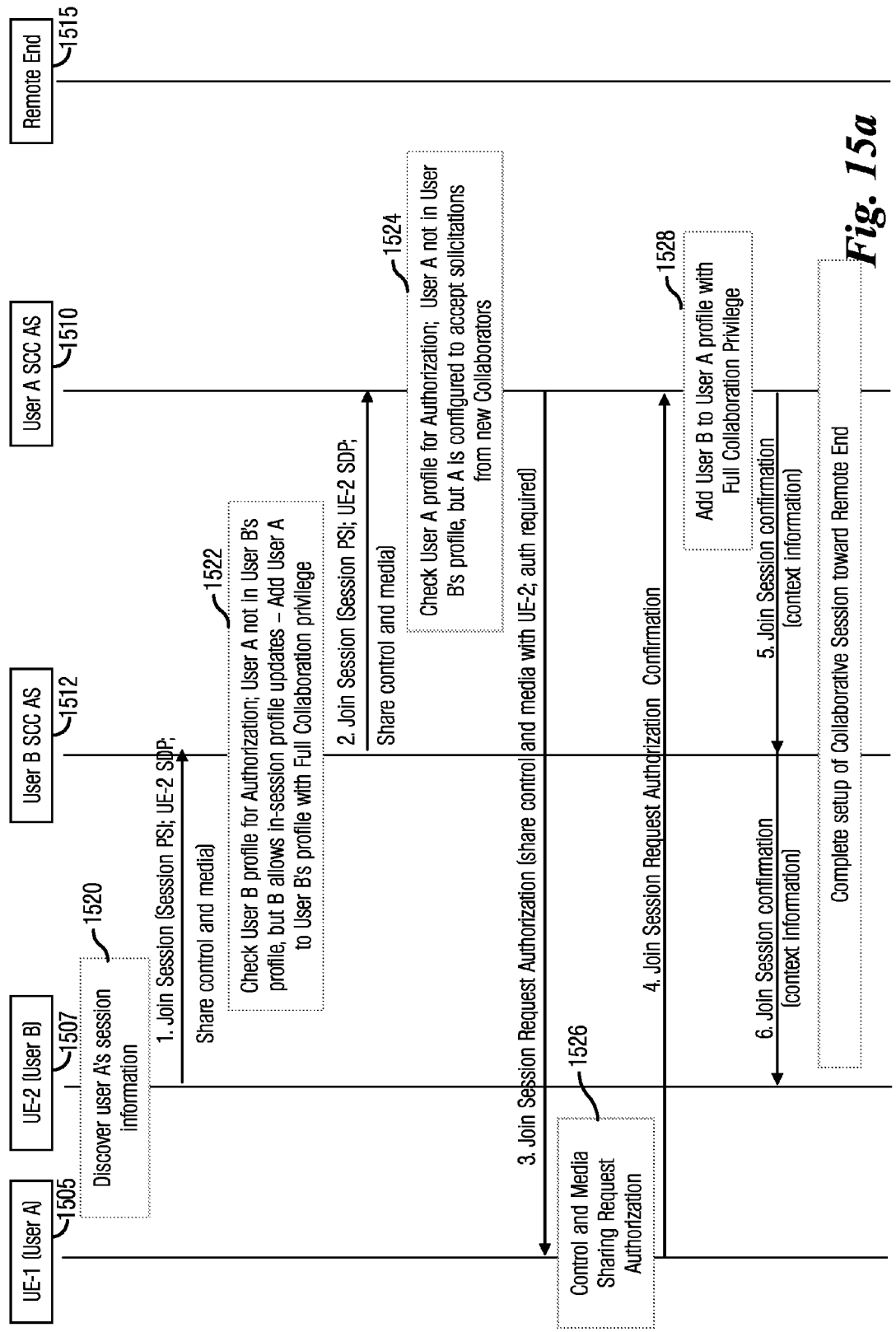
FIG. 15a is a diagram of a message exchange where USER B adds itself to an ongoing collaborative session with USER A for sharing control and media and USER A and USER B not being configured in each other's profiles.

FIG. 15a illustrates a message exchange where USER B adds itself to an ongoing collaborative session with USER A for sharing control and media and USER A and USER B not being configured in each other's profiles. However, USER A and USER B may be configured to accept in-session profile updates and new solicitations. As shown in FIG. 15a, the message exchange in establishing a collaborative session involves messages between USER A 1505, USER B 1507, a first SCC AS 1510 serving USER A 1505, a second SCC AS 1512 serving USER B 1507, and remote end users 1515.

The message exchange may begin with USER B 1507 discovering information related to the collaborative session involving USER A 1405 (block 1520). USER B 1507 may attempt to add itself to the collaborative session by transmitting a JOIN SESSION message to second SCC AS 1512, serving USER B 1507 (shown as event #1). Second SCC AS 1512 may check a profile of USER B 1507 for authorization (block 1522). Second SCC AS 1512 may determine that USER A 1505 is not in the profile of USER B 1507, however USER B 1507 allows in-session updates to its profile. Second SCC AS 1512 may add USER A 1505 to the profile of USER B 1507 (block 1522). USER A 1505 may be added with full collaboration privileges.

For discussion purposes, assume that USER B 1507 is authorized and that USER A 1505 has been added to the profile of USER B 1507 with full collaboration privileges. Second SCC AS 1512 may send a join session message to first SCC AS 1510 which is serving USER A 1505 (shown as event #2). The join session message may be in the form of a JOIN SESSION message or equivalent message.

First SCC AS 1510 may check a profile of USER A 1407 for authorization (block 1524). However, USER A 1505 is not in the profile of USER B 1507 but USER A 1505 may be configured to accept solicitations from new collaborators. First SCC AS 1510 may transmit a join session request authorization message to USER A 1505 (shown as event #3). The join session request authorization message may be in the form of a JOIN SESSION REQUEST AUTHORIZATION message or equivalent message.

USER A 1505 may perform a control and media sharing request authorization (block 1526). Assume that the control and media request authorization succeeded, USER A 1505 may allow USER B 1507 to join in the collaborative session and may respond with a join session request authorization confirmation message to first SCC AS 1510 (shown as event #4). The join session request authorization confirmation message may be in the form of a JOIN SESSION REQUEST AUTHORIZATION CONFIRMATION message or equivalent message.

First SCC AS 1510 may add USER B 1507 to the profile of USER A 1505 with full collaboration privileges (block 1528). According to an alternative embodiment, if USER B 1507 already exists in the profile of USER A 1505, then instead of adding USER B 1507, collaborative privileges of USER B 1507 may be updated in the profile of USER A 1505. First SCC AS 1510 may send a join session confirmation message (in the form of a JOIN SESSION CONFIRMATION message or equivalent message) to second SCC AS 1512 (shown as event #5) and second SCC AS 1512 may sent a join session confirmation message (e.g., a JOIN SESSION CONFIRMATION message or equivalent message) to USER B 1507 (shown as event #6). USER A 1505, USER B 1507, first SCC AS 1510, second SCC AS 1512, and remote end users 1515 may participate in further message exchanges to complete the setup of the collaborative session with remote end users 1515.

FIG. 15*b* illustrates a flow diagram of USER operations at USER B 1507 in joining an ongoing collaborative session with USER A 1505, USER A 1505 and USER B 1507 not being configured in each others profiles, and USER A 1505 and USER B 1507 may be configured to accept in-session profile updates and new solicitations. FIG. 15*c* illustrates a flow diagram of SCC AS operations at second SCC AS 1512 in joining an ongoing collaborative session with USER A 1505, USER A 1505 and USER B 1507 not being configured in each others profiles, and USER A 1505 and USER B 1507 may be configured to accept in-session profile updates and new solicitations. FIG. 15*d* illustrates a flow diagram of SCC AS operations at first SCC AS 1510 in joining an ongoing collaborative session with USER A 1505, USER A 1505 and USER B 1507 not being configured in each others profiles, and USER A 1505 and USER B 1507 may be configured to accept in-session profile updates and new solicitations. FIG. 15*e* illustrates a flow diagram of USER operations at USER A 1505 in joining an ongoing collaborative session with USER A 1505, USER A 1505 and USER B 1507 not being configured in each others profiles, and USER A 1505 and USER B 1507 may be configured to accept in-session profile updates and new solicitations.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for application server operations, the method comprising:
receiving a first message from a first application server at a second application server, the first message comprising a request to initiate a collaborative session between a first communications device and a second communications device;
establishing, by the second application server, the collaborative session in accordance with a first profile of the first communications device and a second profile of the second communications device, wherein the collaborative session provides both the first communications device and the second communications device with access to media provided by the second applications server, wherein upon establishing the collaborative session, the second applications server provides identical content to both the first communications device and the second communications device via a common multimedia session;
sending a second message to the first application server, the second message including information regarding the collaborative session;
establishing a first session control signaling channel between the first communications device and the second applications server;
determining whether the second communications device shares control privileges for the existing collaborative session with the first communications device; and
establishing a second session control signaling channel between the second communications device and the second applications server when the second communications device shares control privileges for the existing collaborative session with the first communications device,
wherein the first session control signaling channel and the second session control signaling channel are configured to synchronize control of the collaborative session between the first communications device and the second communications device when the second communications device shares control privileges with the first communications device, and
wherein establishing the collaborative session comprises creating a collaborating profile reference for the second communications device in an existing IMS subscriber profile of a user registered to the first communications device upon subscriber provision or upon subscriber input after subscriber provision.

2. The method of claim 1, wherein the first communications device belongs to a first user, and wherein the second communications device belongs to the first user or a second user.

3. The method of claim 1, wherein establishing the collaborative session is based on a first privilege setting for the first communications device and a second privilege setting for the second communications device.

4. The method of claim 1, wherein the first communications device and the second communications device share control and information in the collaborative session.

5. The method of claim 4, wherein the first communications device and the second communications device both have a full collaboration setting.

6. The method of claim 4, wherein establishing the collaborative session comprises:
sending a third message to the second communications device, the third message including a request to join the collaborative session and an indicator of no authorization required; and
receiving a fourth message from the second communications device, the fourth message including a confirmation to the request to join the collaborative session.

7. The method of claim 4, wherein establishing the collaborative session comprises:
sending a third message to the second communications device, the third message including a request to join the collaborative session and an indicator of authorization required, wherein the authorization comprises authorizing a sharing of control and information; and
receiving a fourth message from the second communications device if the authorization succeeded, the fourth message including a confirmation to the request to join the collaborative session.

8. The method of claim 7, wherein establishing the collaborative session further comprises adding a profile of the first communications device to the second profile of the second communications device or updating the profile of the first communications device in the second profile of the second communications device.

9. The method of claim 1, wherein the second communications device serves the media to the first communications device.

10. The method of claim 9, wherein the first communications device has a controller privilege setting that indicates a capability of providing media to other communications device during collaborative sessions controlled by a third party, and wherein the second communications device has a media source privilege setting that indicates a capability of providing media to other communications device during collaborative sessions controlled by the second communications device.

11. The method of claim 9, wherein establishing the collaborative session comprises:
sending a third message to the second communications device, the third message including a request to join the collaborative session to share information and an indicator of no authorization required; and
receiving an fourth message from the second communications device, the fourth message including a confirmation to the request to join the collaborative session.

12. The method of claim 9, wherein establishing the collaborative session comprises:
sending a third message to the second communications device, the third message including a request to join the collaborative session to share information and an indicator of authorization required, wherein the authorization comprises authorizing a sharing of information; and
receiving a fourth message from the second communications device if the authorization succeeded, the fourth message including a confirmation to the request to join the collaborative session.

13. The method of claim 12, wherein establishing the collaborative session further comprises adding a profile of the first communications device to the second profile of the second communications device or updating the profile of the first communications device in the second profile of the second communications device.

14. The method of claim 1, wherein the second session control signaling channel is configured to carry messages for selecting content to be provided via the common multimedia session from the second communications device to the second applications server.

15. A method for application server operations, the method comprising:
receiving a first message from a first applications server at a second applications server, the first message comprising a request to add a first communications device to an existing collaborative session;
examining a first profile of the first communications device and a second profile of a second communications device, wherein the second communications device is a collaborator in the existing collaborative session;
adding the first communications device to the existing collaborative session in accordance with the first profile of the first communications device and the second profile of the second communications device, wherein the existing collaborative session is used by both the first communications device and the second communications device to access media being provided by the second applications server after the first communications device is added to the existing collaborative session, and wherein upon adding the first communications device to the collaborative session, the second applications server provides identical content to both the first communications device and the second communications device via a common multimedia session;
sending a second message to the applications server, the second message comprising a confirmation for the request to add the first communications device to the existing collaborative session;
determining whether the second communications device shares control privileges for the existing collaborative session with the first communications device;
establishing a first session control signaling channel between the first communications device and the second applications server if the second communications device shares control privileges for the existing collaborative session with the first communications device; and
establishing a second session control signaling channel between the second communications device and the second applications server,
wherein the first session control signaling channel and the second session control signaling channel are configured to synchronize control of the collaborative session between the first communications device and the second communications device when the second communications device shares control privileges with the first communications device, and wherein adding the first communications device to the existing collaborative session comprises creating a collaborating profile reference for the first communications device in an existing IMS subscriber profile of a user registered to the second communications device upon subscriber provision or upon subscriber input after subscriber provision.

16. The method of claim 15, wherein adding the first communications device comprises:
sending a third message to the second communications device, the third message including a request to add the first communications device to the existing collaborative session and an indicator of no authorization required; and
receiving a fourth message from the second communications device, the fourth message including a confirmation to the request to add the first communications device to the existing collaborative session.

17. The method of claim 15, wherein adding the first communications device comprises:
sending a third message to the second communications device, the third message including a request to add the first communications device to the existing collaborative session and an indicator of authorization required; and
receiving a fourth message from the second communications device if the authorization succeeded, the fourth message including a confirmation to the request to add the first communications device to the existing collaborative session.

18. The method of claim 17, wherein the authorization comprises an authorization for sharing of control and information.

19. The method of claim 17, further comprising adding a profile of the first communications device to the second profile of the second communications device or updating the profile of the first communications device in the second profile of the second communications device.

20. A method for application server operations, the method comprising:
receiving a first message from a first communications device, the first message comprising a request to add the first communications device to an existing collaborative session;
examining a first profile of the first communications device and a second profile of a second communications device, wherein the second communications device is a collaborator in the existing collaborative session;
sending, by a first applications server, a message to a second applications server, the message requesting that the first communications device be added to the existing collaborative session;
receiving a response responsive to the request, the response indicating that the first communications device has been added to the existing collaborative session, wherein the existing collaborative session is used by both the first communications device and the second communications device to access media provided by the second applications server after the first communications device is added to the existing collaborative session, and wherein upon adding the first communications device to the collaborative session, the second applications server provides identical content to both the first communications device and the second communications device via a common multimedia session;
determining whether the second communications device shares control privileges for the existing collaborative session with the first communications device;
facilitating establishment of a first session control signaling channel between the first communications device and the second applications server when the second communications device shares control privileges for the existing collaborative session with the first communications device; and
facilitating establishment of a second session control signaling channel between the second communications device and the second applications server,
wherein the first session control signaling channel and the second session control signaling channel synchronize control of the collaborative session between the first communications device and the second communications device when the second communications device shares control privileges with the first communications device, and
wherein the message requesting that the first communications device be added to the existing collaborative session prompts the second communications server to create a collaborating profile reference for the first communications device in an existing IMS subscriber profile of a user registered to the second communications device upon subscriber provision or upon subscriber input after subscriber provision.

21. The method of claim 20, further comprising adding a profile of the second communications device to the first profile of the first communications device or updating the profile of the second communications device in the first profile of the first communications device.

22. The method of claim 20, wherein the first communications device is unable to select content provided via the common multimedia session upon determining that the second communications device does not share control privileges for the existing collaborative session with the first communications device, and wherein the both first communications device and the second communications device are able to select content provided via the common multimedia session upon determining that the first communications device and the second communications device share control privileges for the existing collaborative session.

23. The method of claim 1, wherein the first communications device and the second communications device are provided identical content over the common multimedia session,
wherein the first communications device lacks the capability to select content provided via the common multimedia session upon determining that the second communications device does not share control privileges for the collaborative session with the first communications device, and
wherein both the first communications device and the second communications device have the capability to select content provided via the common multimedia session upon determining that the first communications device and the second communications device share control privileges for the collaborative session.

24. The method of claim 15, wherein the second communications device has the exclusive capability of selecting content provided via the common multimedia session upon determining that the second communications device does not share control privileges for the existing collaborative session with the first communications device, and
wherein both the first communications device and the second communications device have the capability to select content provided via the common multimedia session upon determining that the first communications device and the second communications device share control privileges for the existing collaborative session.

25. The method of claim 15, wherein the first session control signaling channel is configured to carry messages for selecting content to be provided via the common multimedia session from the first communications device to the second applications server.

26. The method of claim 20, wherein the first session control signaling channel is configured to carry messages for selecting content to be provided via the common multimedia session from the first communications device to the second applications server.

* * * * *